United States Patent
Shimezawa et al.

(10) Patent No.: US 9,560,643 B2
(45) Date of Patent: *Jan. 31, 2017

(54) RESOURCES FOR MONITORING AN EPDCCH DEPENDING ON TRANSMISSION MODE

(75) Inventors: Kazuyuki Shimezawa, Osaka (JP); Toshizo Nogami, Osaka (JP); Kimihiko Imamura, Osaka (JP); Daiichiro Nakashima, Osaka (JP); Tatsushi Aiba, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/235,581

(22) PCT Filed: Jul. 25, 2012

(86) PCT No.: PCT/JP2012/068825
§ 371 (c)(1),
(2), (4) Date: Jan. 28, 2014

(87) PCT Pub. No.: WO2013/018612
PCT Pub. Date: Feb. 7, 2013

(65) Prior Publication Data
US 2014/0169328 A1    Jun. 19, 2014

(30) Foreign Application Priority Data
Jul. 29, 2011  (JP) ................................. 2011-166648

(51) Int. Cl.
*H04W 72/04*    (2009.01)
*H04W 72/12*    (2009.01)
(Continued)

(52) U.S. Cl.
CPC ......... *H04W 72/042* (2013.01); *H04B 7/0452* (2013.01); *H04B 7/0617* (2013.01);
(Continued)

(58) Field of Classification Search
CPC ........... H04W 72/042; H04W 72/0406; H04W 72/0453; H04W 72/1289; H04L 27/2602; H04L 5/0053; H04L 5/0051; H04L 5/0023; H04L 5/005; H04L 5/0048; H04B 7/0617; H04B 7/0452; H04J 13/0074
See application file for complete search history.

(56) References Cited

U.S. PATENT DOCUMENTS 9,054,843 B2    6/2015   Frederiksen et al.
2011/0044391 A1  2/2011   Ji et al.
(Continued)

FOREIGN PATENT DOCUMENTS

JP    2012-4609 A    1/2012
WO    2010/053984 A2    5/2010

OTHER PUBLICATIONS

Chen et al., Advanced Wireless COmmunication Systems and Techniques, U.S. Appl. No. 61/471,042, filed Apr. 2011.*
(Continued)

*Primary Examiner* — Justin T Van Roie
(74) *Attorney, Agent, or Firm* — Keating & Bennett, LLP

(57) ABSTRACT

A base station is configured to communicate with a terminal using a resource element configured of an area in the frequency direction and an area in the temporal direction, and a resource block pair configured of a predetermined number of the resource elements. The base station includes: a second control channel generating unit configured to generate a second control channel which can be mapped to a second control channel area which is an area different from
(Continued)

a first control channel area where a first control channel can be mapped, and which is set to the terminal from the base station in units of the resource block pair. A resource element group which is a group of the predetermined resource elements in the resource block pair of the second control channel area is configured, and the second control channel is mapped to a plurality of the resource element groups.

12 Claims, 14 Drawing Sheets

(51) Int. Cl.
  *H04B 7/04*   (2006.01)
  *H04B 7/06*   (2006.01)
  *H04L 27/26*  (2006.01)
  *H04J 13/00*  (2011.01)
  *H04L 5/00*   (2006.01)

(52) U.S. Cl.
  CPC ........ *H04L 5/0053* (2013.01); *H04L 27/2602* (2013.01); *H04W 72/1289* (2013.01); *H04J 13/0074* (2013.01); *H04L 5/005* (2013.01); *H04L 5/0023* (2013.01); *H04L 5/0048* (2013.01); *H04L 5/0051* (2013.01); *H04W 72/0406* (2013.01); *H04W 72/0453* (2013.01)

(56) References Cited

U.S. PATENT DOCUMENTS

| | | | |
|---|---|---|---|
| 2011/0076962 A1* | 3/2011 | Chen | H04L 5/001 455/68 |
| 2012/0054258 A1 | 3/2012 | Li et al. | |
| 2013/0039284 A1 | 2/2013 | Marinier et al. | |
| 2013/0044664 A1* | 2/2013 | Nory et al. | 370/311 |
| 2013/0044693 A1 | 2/2013 | Lindh et al. | |
| 2013/0107861 A1 | 5/2013 | Cheng et al. | |
| 2013/0114517 A1 | 5/2013 | Blankenship et al. | |
| 2013/0194931 A1 | 8/2013 | Lee et al. | |
| 2013/0195067 A1 | 8/2013 | Khoshnevis et al. | |
| 2013/0215842 A1 | 8/2013 | Han et al. | |
| 2013/0242880 A1 | 9/2013 | Miao et al. | |
| 2013/0242882 A1* | 9/2013 | Blankenship et al. | 370/329 |
| 2013/0301562 A1* | 11/2013 | Liao et al. | 370/329 |
| 2014/0044070 A1* | 2/2014 | Chen | H04B 7/0486 370/329 |
| 2015/0036615 A1* | 2/2015 | Shimezawa | H04W 72/00 370/329 |
| 2015/0063241 A1* | 3/2015 | Shimezawa | H04W 72/042 370/329 |
| 2015/0296488 A1* | 10/2015 | Shimezawa | H04W 72/04 370/329 |
| 2015/0358124 A1* | 12/2015 | Suzuki | H04L 1/1861 370/329 |

OTHER PUBLICATIONS

Official Communication issued in International Patent Application No. PCT/JP2012/068825, mailed on Oct. 30, 2012.
3GPP TR 36.814 V9.0.0, "3rd Generation Partnership Project; Technical Specification Group Radio Access Network; Further Advancements for E-UTRA Physical Layer Aspects (Release 9)", Mar. 2010; 9 pages.
3GPP TS 36.212 V10.1.0, "3rd Generation Partnership Project; Technical Specification Group Radio Access Network; Evolved Universal Terrestrial Radio Access (E-UTRA); Multiplexing and channel coding (Release 10)", Mar. 2011; 28 pages.
Panasonic, 3GPP TSG RAN WG1 Meeting #64, "Resource Allocation Schemes of R-PDCCH", R1-110777, Taipei Taiwan, Feb. 21-25, 2011, pp. 1-7.
NEC Group, "Supporting Frequency Diversity and Frequency Selective R-PDCCH Transmissions", 3GPP TSG-RAN WG1 #61, R1-103062, May 4, 2010, pp. 1-6.
Panasonic, "R-PDCCH Placement", 3GPP TSG RAN WG1 #60bis, R1-102042, Apr. 6, 2010, pp. 1-5.
Research in Motion, UK Limited, "PDCCH Enhancement Considerations," 3GPP TSG RAN WG1 Meeting #65, R1-111661, May 9-13, 2011. pp. 1-4.
3GPP, "3rd Generation Partnership Project; Technical Specification Group Radio Access Network; Coordinated Multi-point Operation for LTE Physical layer aspects (Release 11)" 3GPP TR 36.819 V.11.0.0, Sep. 2011, pp. 1-68.
NTT DOCOMO, "Mapping Design for E-PDCCH in Rel-11" 3GPP TSG RAN WG1 Meeting #68, R1-120411, Feb. 6-10, 2012, pp. 1-7.
Nokia et al., "Multiplexing of E-PDCCH for different users" 3GPP TSG RAN WG1 Meeting #68, R1-120735, Feb. 6-10, 2012, 4 pages.
Ericsson et al., "On Multiplexing of DCI messages" 3GPP TSG RAN WG1 Meeting #68, R1-120078 Feb. 6-10, 2012, 5 pages.
Samsung, "Multiplexing of Multiple E-PDCCHs for Distributed and Localized Transmissions" 3GPP TSG RAN WG1 Meeting #68, R1-120191, Feb. 6-10, 2012, pp. 1-3.
Panasonic, "Multiplexing of e-PDCCHs and ePDCCH RE Mapping" 3GPP TSG RAN WG1 Meeting #68, R1-120237, Feb. 6-10, 2012, pp. 1-4.
LG Electronics, "Concept of E-PDCCH CCE" 3GPP TSG RAN WG1 Meeting #68, R1-120454, Feb. 6-10, 2012, 3 pages.
Sharp, "Partitioning of PRB Pair and eCCE structure" 3GPP TSG RAN WG1 Meeting #68, R1-120281, Feb. 6-10, 2012, pp. 1-8.
Samsung, "Discussion on ePDCCH Design Issues" 3GPP TSG RAN WG1 Meeting #66, R1-112517, Aug. 22-26, 2011, pp. 1-4.
Nokia et al., "Considerations on Search Spaces for the E-PDCCH" 3GPP TSG RAN WG1 Meeting #68, R1-120734, Feb. 6-10, 2012, 5 pages.
Qualcomm Incorporated, "Multiplexing of Different DCI Messages for e-PDCCH" 3GPP TSG RAN WG1 Meeting #68, R1-120562, Feb. 6-10, 2012, 2 pages.
NEC Group, "DCI Multiplexing for E-PDCCH" 3GPP TSG RAN WG1 Meeting #68, R1-120257, Feb. 6-10, 2012, 7 pages.
Huawei et al, "Investigation on Downlink Control Channel and Signaling Enhancements" 3GPP TSG RAN WG1 Meeting #66, R1-112049, Aug. 22-26, 2011, 4 pages.
Research in Motion, UK Limited, "Search Space Design for E-PDCCH" 3GPP TSG RAN WG1 Meeting #68, R1-120330, Feb. 6-10, 2012, pp. 1-6.
Ericsson et al., "Discussion on Un Starting Times" 3GPP TSG RAN WG1 Meeting #61, Tdoc R1-120633 May 10-14, 2010, pp. 1-3.
Nortel Neworks, "Control Channel and Data Channel Design for Relay link in LTE-Advanced " TSG-RAN1 #55 bis Jan. 12-16, 2009, pp. 1-17.
Huawei, "Some Issues Concerning RN Startup" 3GPP TSG RAN WG2 Meeting #70, R2-102974 May 10-14, 2010, 3 pages.
Ericsson et al., "Enhancements for UE Specific Control Signaling" 3GPP TSG RAN WG1 Meeting #65, Tdoc R1-111332 May 9-13, 2011, pp. 1-3.

* cited by examiner

RESOURCES FOR MONITORING AN EPDCCH DEPENDING ON TRANSMISSION MODE

TECHNICAL FIELD

The present invention relates to a base station, a terminal, a communication system, a communication method, and an integrated circuit.

BACKGROUND ART

Wireless communication systems such as WCDMA (Wideband Code Division Multiple Access) LTE (Long Term Evolution), and LTE-A (LTE-Advanced) developed by 3GPP (Third Generation Partnership Project), and Wireless LAN and WiMAX (Worldwide Interoperability for Microwave Access) under IEEE (The Institute of Electrical and Electronics engineers) are configured as follows. A base station (cell, transmission station, transmission device, eNodeB) and a terminal (mobile terminal, reception station, mobile station, reception device, UE (User Equipment)) each have a plurality of transmission/reception antennas, and spatially multiplex data signals using MIMO (Multi Input Multi Output) technology to realize high-speed data communication.

The base station needs to control the terminal in various ways in the wireless communication system in order to realize data communication between the base station and the terminal. To this end, the base station informs the terminal of control information using a predetermined resource, thereby performing data communication in a downlink and an uplink. For example, the base station informs the terminal of resource assignment information, data signal modulation and encoding information, spatial multiplexing order information for data signals, transmission power control information, and so forth, thereby realizing data communication. Such control information can be informed using a method according to NPL 1.

Also, various methods can be employed as a communication method employing the MIMO technology in a downlink. Available examples of these methods include the multiuser MIMO format for assigning the same resource to different terminals, and the CoMP (Cooperative Multipoint) format where a plurality of base stations performing data communication by mutually collaborating.

FIG. 15 is a diagram illustrating an example employing the multiuser MIMO format. In FIG. 15, a base station 1501 performs data communication with a terminal 1502 through a downlink 1504, and performs data communication with a terminal 1503 through a downlink 1505. At this time, the terminal 1502 and terminal 1503 perform data communication by multiuser MIMO. The downlink 1504 and downlink 1505 use the same resource in the frequency direction and in the temporal direction. Also, beam control is performed using precoding technology or the like for the downlink 1504 and downlink 1505, thereby mutually maintaining orthogonality or reducing same channel interference. Thus, the base station 1501 can realize data communication with the terminal 1502 and terminal 1503 using the same resource.

FIG. 16 is a diagram illustrating an example employing the CoMP format. FIG. 16 illustrates a case where a wireless communication system having a heterogeneous network configuration is constructed using a macro base station 1601 having a wide coverage, and a RRH (Remote Radio Head) 1602 having a narrower coverage than the coverage of the macro base station thereof. Now, let us consider a case where the coverage of the macro base station 1601 includes partially or entirely the coverage of the RRH 1602. In the case of the example illustrated in FIG. 16, the heterogeneous network configuration is constructed using the macro base station 1601 and RRH 1602. The macro base station 1601 and RRH 1602 mutually collaborate to perform data communication with a terminal 1604 through a downlink 1605 and a downlink 1606, respectively. The macro base station 1601 is connected to the RRH 1602 through a line 1603, and can transmit/receive control signals and data signals to/from the RRH 1602. Available examples of the line 1603 include cable lines such as optical fibers, and wireless lines employing relay technology. At this time, each of the macro base station 1601 and RRH 1602 uses the same frequency (resource) partially or entirely, thereby improving overall frequency use efficiency (capacity of transmission) within the coverage area which the macro base station 1601 constructs.

In the case that the terminal 1604 is positioned nearby the macro base station 1601 or RRH 1602, the terminal 1604 can perform single cell communication with the macro base station 1601 or RRH 1602. Further, in the case that the terminal 1604 is positioned in the vicinity of an edge (cell edge) of the coverage which the RRH 1602 constructs, same channel interference from the macro base station 1601 needs to be dealt with. There has been studied a method for reducing or suppressing the interference as to the terminal 1604 at the cell edge area by employing the CoMP format wherein adjacent base stations mutually collaborate, by way of multi-cell communication (collaborative communication) between the macro base station 1601 and RRH 1602. A method according to NPL 2 has been studied as such a CoMP format, for example.

CITATION LIST

Non Patent Literature

NPL 1: 3rd Generation Partnership Project; Technical Specification Group Radio Access Network; Evolved Universal Terrestrial Radio Access (E-UTRA); Physical layer procedures (Release 10), March 2011, 3GPP TS 36.212 V10.1.0 (2011-03)

NPL 2: 3rd Generation Partnership Project; Technical Specification Group Radio Access Network; Further Advancements for E-UTRA Physical Layer Aspects (Release 9), March 2010, 3GPP TR 36.814 V9.0.0 (2010-03)

SUMMARY OF INVENTION

Technical Problem

However, s wireless communication system enabling MIMO communication such as the multiuser MIMO format or CoMP format has improved capacity of transmission which one base station can provide, and accordingly, the number of terminals which can be accommodated also increases. Therefore, in the case that the base station informs control information to a terminal using conventional resources, there may be a case where resources to which the control information is assigned are insufficient. In this case, it becomes difficult for the base station to effectively assign data to the terminal, which is a factor impeding improvement in transmission efficiency.

The present invention has been made in the light of the above-mentioned problem, and it is an object thereof to provide, a base station, a terminal, a communication system, a communication method, and an integrated circuit, which enable the base station to effectively inform control information to the terminal in a wireless communication system where the base station communicates with the terminal.

Solution to Problem (1) A base station according to an embodiment of the present invention is a base station configured to communicate with a terminal using a resource element configured of an area in the frequency direction and an area in the temporal direction, and a resource block pair configured of a predetermined number of the resource elements. The base station includes a second control channel generating unit configured to generate a second control channel which can be mapped to a second control channel area which is an area different from a first control channel area where a first control channel can be mapped, and which is set to the terminal from the base station in units of the resource block pair. A resource element group which is a group of the predetermined resource elements in the resource block pair of the second control channel area is configured, and the second control channel is mapped to a plurality of the resource element groups.

(2) Also, a base station according to an embodiment of the present invention is the above-mentioned base station, and one of a first method for mapping the second control channel to a plurality of the resource element groups in the single resource block pair, and a second method for mapping the second control channel to a plurality of the resource element groups in a plurality of the resource block pairs, is used for mapping of the second control channel.

(3) Also, a base station according to an embodiment of the present invention is the above-mentioned base station, and informs the terminal of information indicating one of the first method and the second method to be used for mapping of the second control channel as to the terminal.

(4) Also, a base station according to an embodiment of the present invention is the above-mentioned base station, and one of the first method and the second method is used for mapping of the second control channel based on terminal capability information or FGI informed from the terminal, and the terminal capability information and FGI indicates whether or not the first method and/or the second method can be applied to the terminal.

(5) Also, a base station according to an embodiment of the present invention is the above-mentioned base station, and further includes: a terminal-specific reference signal generating unit configured to generate a terminal-specific reference signal using the same antenna port as with the second control channel; and a precoding unit configured to perform precoding processing on the second control channel and the terminal-specific reference signal in units of the resource block pair.

(6) Also, a terminal according to an embodiment of the present invention is a terminal configured to communicate with a base station using a resource element configured of an area in the frequency direction and an area in the temporal direction, and a resource block pair configured of a predetermined number of the resource elements. The terminal includes: a control channel processing unit configured to detect a second control channel which can be mapped to a second control channel area which is an area different from a first control channel area where a first control channel can be mapped, and which is set to the terminal from the base station in units of the resource block pair. A resource element group which is a group of the predetermined resource elements in the resource block pair of the second control channel area is configured, and the second control channel is mapped to a plurality of the resource element groups.

(7) Also, a terminal according to an embodiment of the present invention is the above-mentioned terminal, and one of a first method for mapping the second control channel to a plurality of the resource element groups in the single resource block pair, and a second method for mapping the second control channel to a plurality of the resource element groups in a plurality of the resource block pairs, is used for mapping of the second control channel.

(8) Also, a terminal according to an embodiment of the present invention is the above-mentioned terminal, and information indicating one of the first method and the second method to be used for mapping of the second control channel as to the terminal is informed from the base station.

(9) Also, a terminal according to an embodiment of the present invention is the above-mentioned terminal, which informs the base station of terminal capability information which is information indicating whether or not the first method and/or the second method can be applied to the terminal, or FGI.

(10) Also, a terminal according to an embodiment of the present invention is the above-mentioned terminal, and the control channel processing unit detects the second control channel using a terminal-specific reference signal used for the same antenna port as with the second control channel, and the second control channel and the terminal-specific reference signal are assumed to have been subjected to precoding processing at each of the antenna ports in units of the resource block pair.

(11) Also, a communication system according to an embodiment of the present invention is a communication system where a base station communicates with a terminal using a resource block pair configured of an area in the frequency direction and an area in the temporal direction, and a resource block pair configured of a predetermined number of the resource elements. The base station includes a second control channel generating unit configured to generate a second control channel which can be mapped to a second control channel area which is an area different from a first control channel area where a first control channel can be mapped, and which is set to the terminal from the base station in units of the resource block pair. The terminal includes a control channel processing unit configured to detect the second control channel. A resource element group which is a group of the predetermined resource elements in the resource block pair of the second control channel area is configured, and the second control channel is mapped to a plurality of the resource element groups.

(12) Also, a communication method according to an embodiment of the present invention is a communication method of a base station which communicates with a terminal using a resource block pair configured of an area in the frequency direction and an area in the temporal direction, and a resource block pair configured of a predetermined number of the resource elements. The method includes: a step for generating a second control channel which can be mapped to a second control channel area which is an area different from a first control channel area where a first control channel can be mapped, and which is set to the terminal from the base station in units of the resource block pair. A resource element group which is a group of the predetermined resource elements in the resource block pair of the second control channel area is configured, and the second control channel is mapped to a plurality of the resource element groups.

(13) Also, a communication method according to an embodiment of the present invention is a communication method of a terminal which communicates with a base station using a resource element configured of an area in the frequency direction and an area in the temporal direction, and a resource block pair configured of a predetermined number of the resource elements. The method includes: a step for detecting a second control channel which can be mapped to a second control channel area which is an area different from a first control channel area where a first control channel can be mapped, and which is set to the terminal from the base station in units of the resource block pair. A resource element group which is a group of the predetermined resource elements in the resource block pair of the second control channel area is configured, and the second control channel is mapped to a plurality of the resource element groups.

(14) Also, an integrated circuit according to an embodiment of the present invention is an integrated circuit which functions in a base station which communicates with a terminal using a resource element configured of an area in the frequency direction and an area in the temporal direction, and a resource block pair configured of a predetermined number of the resource elements. The circuit has a function to generate a second control channel which can be mapped to a second control channel area which is an area different from a first control channel area where a first control channel can be mapped, and which is set to the terminal from the base station in units of the resource block pair. A resource element group which is a group of the predetermined resource elements in the resource block pair of the second control channel area is configured, and the second control channel is mapped to a plurality of the resource element groups.

(15) Also, an integrated circuit according to an embodiment of the present invention is an integrated circuit which functions in a terminal which communicates with a base station using a resource element configured of an area in the frequency direction and an area in the temporal direction, and a resource block pair configured of a predetermined number of the resource elements. The circuit has a function to detect a second control channel which can be mapped to a second control channel area which is an area different from a first control channel area where a first control channel can be mapped, and which is set to the terminal from the base station in units of the resource block pair. A resource element group which is a group of the predetermined resource elements in the resource block pair of the second control channel area is configured, and the second control channel is mapped to a plurality of the resource element groups.

Advantageous Effects of Invention

According to the present invention, a base station can effectively inform control information for a terminal in a wireless communication system wherein the base station and terminal communicate.

DESCRIPTION OF EMBODIMENTS

First Embodiment

Figure 1:
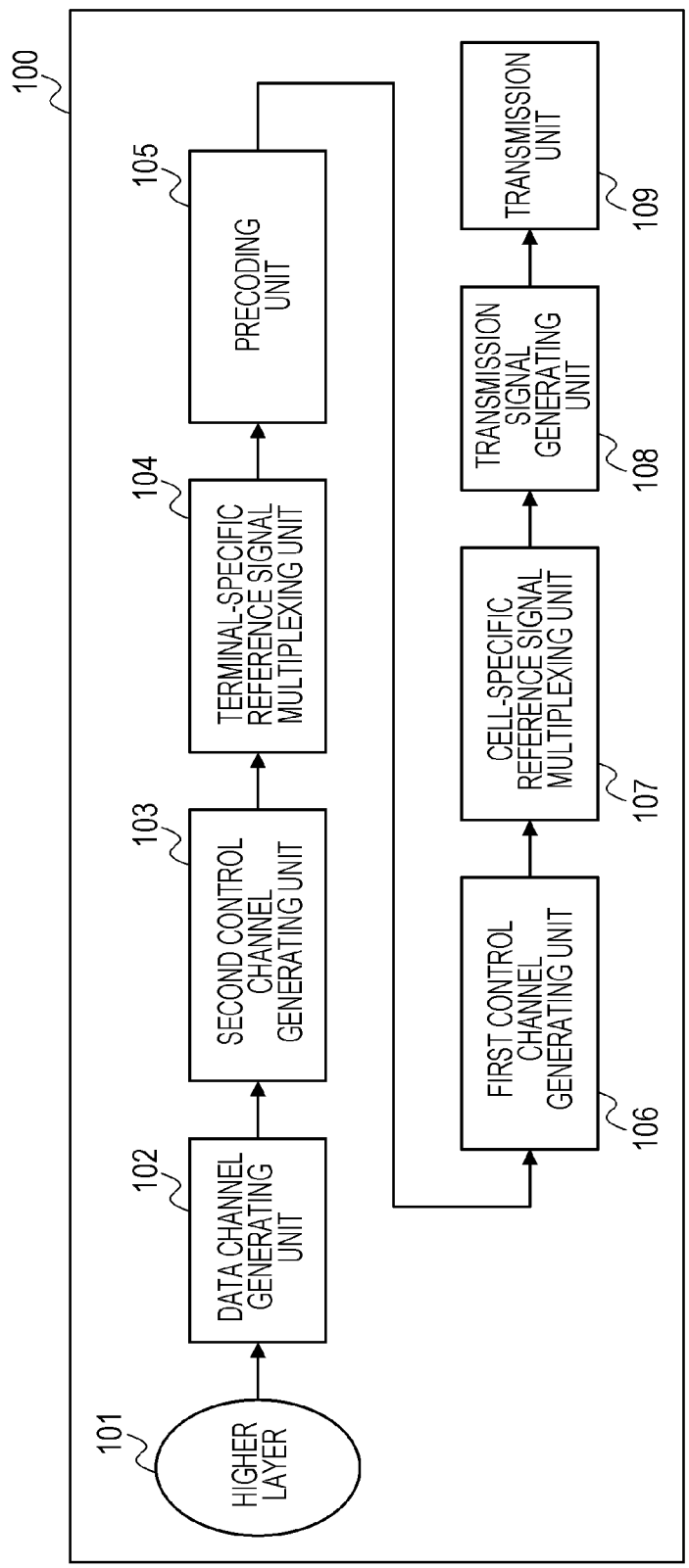
FIG. 1 is a schematic block diagram illustrating a configuration of a base station according to a first embodiment of the present invention.

Hereinafter, a first embodiment of the present invention will be described. A communication system according to the present first embodiment includes a base station 100 (transmission device, cell, transmission point, transmission antenna group, transmission antenna port group, component carrier, eNodeB) and a terminal 200 (terminal device, mobile terminal, reception point, reception terminal, reception device, reception antenna group, reception antenna port group, UE).

The base station 100 of the communication system according to the present embodiment transmits control information and information data through a downlink to perform data communication with a terminal 200.

Here, the control information is subjected to error detection encoding processing or the like, and is mapped to a control channel. The control channel (PDCCH; Physical Downlink Control Channel) is subjected to error correction encoding processing or modulation processing, and is transmitted/received via a first control channel (first physical control channel) area or a second control channel (second physical control channel) area different from the first control channel area. Note however, that the physical control channel mentioned here is a kind of physical channel, and is a control channel defined on a physical frame.

Note that, as seen from one viewpoint, the first control channel is a physical control channel employing the same transmission port (antenna port) as with a cell-specific reference signal. Also, the second control channel is a physical control channel employing the same transmission port as with a terminal-specific reference signal. The terminal 200 demodulates the first control channel using the cell-specific reference signal, and demodulates the second control channel using the terminal-specific reference signal. The cell-specific reference signal is a reference signal common to all terminals within a cell, and is a reference signal which can be used at any terminal since this signal is inserted into almost all resources. Therefore, any terminal can demodulate the first control channel. On the other hand, the terminal-specific reference signal is a reference signal to be inserted into an assigned resource alone, and can be subjected to precoding processing or beam forming processing adaptively, in the same way as with data. Therefore, the advantages of adaptive precoding or beam forming can be obtained at the second control channel.

Also, as seen from a different viewpoint, the control channel (first control channel) to be mapped to the first control channel area is a physical control channel on OFDM symbols (symbols) positioned to the front of a physical sub frame, and can be situated on the entire range of a system bandwidth (component carrier (CC)) on these OFDM symbols. Also, the control channel (second control channel) to be mapped to the second control channel area is a physical control channel on OFDM symbols positioned behind the first control channel of the physical sub frame, and is situated at a part of the system bandwidth on these OFDM symbols. The first control channel is situated on OFDM symbols dedicated for the control channel, positioned to the front of the physical sub frame, whereby the first control channel can be received and demodulated prior to the OFDM symbols for physical data channel that are behind. Also, a terminal which monitors only OFDM symbols dedicated for control channels can also receive the first control channel. Also, the first control channel can be situated in a manner scattered over the entire CC band, and accordingly, inter-cell interference can be randomized. Also, the first control channel area is an area to be set specific to the base station 100, and is an area common to all of the terminals connected to the base station 100. On the other hand, the second control channel is situated on OFDM symbols that are behind, for a shared channel (physical data channel) which a terminal performing communication usually receives. Also, frequency division multiplexing enables orthogonal multiplexing (multiplexing without interference) between the second control channels or between the second control channel and the physical data channel. The second control channel area is an area to be set specific to the terminal 200, and is an area to be set for each terminal to be connected to the base station 100. Note that the base station 100 can set the second control channel area so as to be shared by a plurality of terminals. Also, the first control channel area and the second control channel area are situated in the same physical sub frame. Here, the OFDM symbols are temporal direction units to which the bits of each channel are mapped.

Also, as seen from a different viewpoint, the first control channel is a cell-specific physical control channel, and is a physical channel where both of an idle-state terminal and a connected-state terminal can be obtained (detected). The second control channel is a terminal-specific physical control channel, and is a physical channel where a connected-state terminal alone can be obtained. Here, the idle state is a state in which transmission/reception of data is not to be immediately performed, such as a state in which the base station has not stored information of RRC (Radio Resource Control) (RRC IDLE state), a state in which a mobile terminal is performing intermittent reception (DRX), or the like. On the other hand, the idle state is a state in which transmission/reception of data is to be immediately performed, such as a state in which the base station has stored information of RRC (Radio Resource Control) (RRC_CONNECTED state), a state in which a mobile terminal is NOT performing intermittent reception (DRX), or the like. The first control channel is a channel which a terminal can receive without depending on terminal-specific RRC signaling. The second control channel is a channel to be set by terminal-specific RRC signaling, and is a channel which a terminal can receive using terminal-specific RRC signaling. That is to say, the first control channel is a channel which any terminal can receive according to settings restricted beforehand, and the second control channel is a channel where terminal-specific settings can readily be changed.

FIG. 1 is a schematic block diagram illustrating a configuration of the base station 100 according to the first embodiment of the present invention. In FIG. 1, the base station 100 includes a higher layer 101, a data channel generating unit 102, a second control channel generating unit 103, a terminal-specific reference signal multiplexing unit 104, a precoding unit 105, a first control channel generating unit 106, a cell-specific reference signal multiplexing unit 107, a transmission signal generating unit 108, and a transmission unit 109.

The higher layer 101 generates information data (transport blocks, code words) as to the terminal 200, and outputs this to the data channel generating unit 102. Here, the information data can be taken as units for performing error correction encoding processing. Also, the information data can be taken as units for performing retransmission control such as HARQ (Hybrid Automatic Repeat reQuest) or the like. The base station 100 can also transmit a plurality of the information data to the terminal 200.

The data channel generating unit (data channel area assigning unit, data channel mapping unit) 102 performs adaptive control on the information data output from the higher layer 101 to generate a data channel for the terminal 200. Specifically, the data channel generating unit 102 performs, as adaptive control, encoding processing performing error correction encoding, scramble processing subjecting the information data to scrambling with a unique scramble code specific to the terminal 200, modulation processing employing a multi-value modulation format or the like, layer mapping processing for performing spatial multiplexing such as MIMO or the like. Here, the layer mapping processing at the data channel generating unit 102 maps the generated data channel to one or more layers (streams) based on a rank number set to the terminal 200.

The second control channel generating unit (second control channel area assigning unit, second control channel mapping unit, terminal-specific control channel generating unit) 103 generates a control channel to be transmitted via the second control channel area in the case that the base station 100 transmits control information for the terminal 200 via the second control channel area (terminal-specific control channel area). Also, the control channel to be transmitted via the second control channel area can be transmitted by fixing the rank number to one, and can also be mapped to one or more layers as with the data channel. Here, in the case that the second control channel area is set on a shared channel, the data channel generating unit 102 and second control channel generating unit 103 will also be referred to as shared channel generating units. Here, the control channel to be transmitted via the second control channel area will also be referred to as the second control channel. The data channel or second control channel will also be referred to as a shared channel (common channel).

The second control channel will also be referred to as E-PDCCH (Enhanced PDCCH), terminal-specific control channel.

The terminal-specific reference signal multiplexing unit (terminal-specific reference signal generating unit) 104 generates a terminal-specific reference signal specific to the terminal 200 (reference signal for data channel demodulation, reference signal for second control channel demodulation, reference signal for shared channel demodulation, reference signal for terminal-specific control channel demodulation, DM-RS (Demodulation Reference Signal), DRS (Dedicated Reference Signal), Precoded RS, UE-specific RS), and multiplexes the terminal-specific reference signal into the shared channel. Here, the terminal-specific reference signal is set based on the rank number of the shared channel to be multiplexed, and is multiplexed into each layer. Note that the terminal-specific reference signal is preferably orthogonal and/or semi-orthogonal between layers. Now, an arrangement may be made wherein the terminal-specific reference signal multiplexing unit 104 generates a terminal-specific reference signal, and the generated terminal-specific reference signal is multiplexed at the later-described transmission signal generating unit 108.

The precoding unit 105 performs precoding processing, specific to the terminal 200, on the shared channel and terminal-specific reference signal output from the terminal-specific reference signal multiplexing unit 104. Here, it is desirable to perform the precoding processing such as phase rotation or the like on the generated signal so that the terminal 200 can effectively receive the generated signal (e.g., so as to maximize the received power, so as to reduce interference from adjacent cells, or so as to reduce interference to adjacent cells). Also, processing according to a predetermined precoding matrix, CDD (Cyclic Delay Diversity), transmission diversity (SFBC (Spatial Frequency Block Code), STBC (Spatial Time Block Code), TSTD (Time Switched Transmission Diversity), and FSTD (Frequency Switched Transmission Diversity) or the like) can be employed, but the processing is not restricted to these. Now, in a case where that has been divided into a plurality of kinds has been fed back as PMIs (Precoding Matrix Indicator) which are feedback information regarding the precoding processing from the terminal 200, the base station 100 can perform precoding processing for the terminal 200 based on results obtained by performing calculation such as multiplication or the like on the plurality of the PMIs.

Here, the terminal-specific reference signal is a signal mutually known between the base station 100 and terminal 200. Further, precoding processing specific to the terminal 200 is performed on the shard channel and terminal-specific reference signal by the precoding unit 105. Therefore, the terminal 200 employs the terminal-specific reference signal at the time of demodulating the shared channel, enabling estimation of the state of a transmission path in a downlink between the base station 100 and terminal 200, and an equalized channel precoding-weighted by the precoding unit 105. That is to say, the base station 100 can demodulate the signal subjected to the precoding processing without informing the terminal 200 of the precoding weighting by the precoding unit 105. Also, in the case that the control channel transmitted via the second control channel area is demodulated with the terminal-specific reference signal, the precoding processing is performed on that control channel at the base station 100 in the same way as with the data channel. Also, a transmission path state is estimated from the terminal-specific reference signal, and demodulation processing is performed on the control channel thereof at the terminal 200 in the same way as with the data channel.

When the base station 100 transmits control information for the terminal 200 via the first control channel area (cell-specific control channel area), the first control channel unit (first control channel area assigning unit, first control channel mapping unit, cell-specific control channel generating unit) 106 generates a control channel to be transmitted via the first control channel area. Here, the control channel to be transmitted via the first control channel area will also be referred to as the first control channel. Also, the first control channel will also be referred to as a cell-specific control channel.

The cell-specific reference signal multiplexing unit (cell-specific reference signal generating unit) 107 generates a cell-specific reference signal mutually known between the base station 100 and terminal 200 (reference signal for transmission path state measurement, CRS (Common RS), Cell-specific RS, Non-precoded RS, reference signal for cell-specific control channel demodulation, reference signal for first control channel demodulation), in order to measure the state of a transmission path of the downlink between the base station 100 and terminal 200. The generated cell-specific reference signal is multiplexed into the signal output from the first control channel generating unit 106. Now, an arrangement may be made wherein the cell-specific reference signal multiplexing unit 107 generates a cell-specific reference signal, and the generated cell-specific reference signal is multiplexed at the later-described transmission signal generating unit 108.

Here, an optional signal (series) can be employed as the cell-specific reference signal as long as this signal is mutually known between the base station 100 and terminal 200. For example, a random number or pseudo-noise series based on a parameter assigned beforehand, such as a number (cell ID) specific to the base station 100, or the like, can be employed. Also, there can be employed a method for mutually setting null (zero) between antenna ports regarding a resource element where the cell-specific reference signal is mapped, a method for performing code division multiplexing using pseudo-noise series, a combined method of these, or the like, as a method for realizing an orthogonal state between the antenna ports. Note that the cell-specific reference signal does not have to be multiplexed into all of the sub frames, and may be multiplexed into just a part of the sub frames.

Also, the cell-specific reference signal is a reference signal to be multiplexed after the precoding processing by the precoding unit 105. Therefore, the terminal 200 can use the cell-specific reference signal to measure the state of a transmission path of the downlink between the base station 100 and terminal 200, and demodulate signals not subjected to the precoding processing by the precoding unit 105. For example, the first control channel can be subjected to demodulation processing using the cell-specific reference signal.

The transmission signal generating unit (channel mapping unit) 108 subjects the signal output from the cell-specific reference signal multiplexing unit 107 to mapping processing for the resource element of each antenna port. Specifically, the transmission signal generating unit 108 maps the data channel to the data channel area of the shared channel (PDSCH; Physical Downlink Shared Channel) area, and maps the second control channel to the second control channel area of the shared channel area. Further, the transmission signal generating unit 108 maps the first control channel to the first control channel area different from the second control channel area. Here, the base station 100 can map a control channel addressed to a plurality of terminals to the first control channel area and/or second control channel area. Also, description will be made later regarding a method for assigning a control channel to the first control channel area, and a method for assigning a control channel to the second control channel area. Also, in the case that a plurality of mapping methods of the second control channel as to the second control channel area are defined, the transmission signal generating unit 108 performs processing by switching the mapping method based on parameters of the base station and/or terminal and/or control channel, and so forth. Details thereof will be described later.

Here, the first control channel and second control channel are control channels to be each transmitted via a different resource, and/or control channels to be subjected to demodulation processing each using a different reference signal, and/or control channels which can be transmitted according to the state of a different RRC at the terminal 200. Also, control information of any format can be mapped to each of the control channels. Note that the format of control information that can be mapped can be defined as to each of the control channels. For example, control information with all formats can be mapped to the first control channel, and control information with some formats can be mapped to the second control channel. For example, control information with all formats can be mapped to the first control channel, and control information with a format including assignment information of the data channel employing the terminal-specific reference signal can be mapped to the second control channel.

Now, the formats of the control channels are defined beforehand. For example, the control channels can be defined according to the purpose of the base station 100 informing the terminal 200. Specifically, the control information to be mapped to the control channels can be defined as assignment information of the data channel of the downlink for the terminal 200, assignment information of the uplink data channel (PUSCH; Physical Uplink Shared Channel) or control channel (PUCCH; Physical Uplink Control Channel) for the terminal 200, information for controlling transmission power for the terminal 200, or the like. Therefore, for example, in the case of transmitting information data of the downlink data channel to the terminal 200, the base station 100 transmits the control channel in which the control information including the assignment information of the data channel of the downlink for the terminal 200 is mapped, and the data channel in which the information assigned based on the control information thereof is mapped. Also for example, in a case where the base station 100 assigns an uplink data channel to the terminal 200, the base station 100 transmits a control channel to which there has been mapped control information including assigning information of the uplink channel to the terminal 200. The base station 100 can also transmit a plurality of different control channels or the same channels with a different format or the same format to the same terminal 200 using the same sub frame. Note that, in the case of transmitting information data of the downlink to the terminal 200, the base station 100 can also transmit the data channel of the downlink using a sub frame that is different from the sub frame which transmits the control channel in which is mapped the control information including the assignment information of the data channel of the downlink for the terminal 200.

Now, the first control channel area is an area specific to the base station 100, and accordingly will also be referred to as a cell-specific control channel area. Also, the second control channel area is an area specific to the terminal 200 to be set through RRC signaling from the base station 100, and accordingly will also be referred to as a terminal-specific control channel area. Also, the second control channel area is set with an area where two resource blocks configured of an area in a predetermined frequency direction and an area in a predetermined temporal direction are consecutively situated in the temporal direction as a unit.

The transmission unit 109 transmits a transmission signal from transmission antennas of one or a plurality of transmission antenna numbers (antenna port numbers) after subjecting the transmission signal to IFFT (Inverse Fast Fourier Transform), addition of guard intervals, conversion processing to a radio frequency, and so forth.

Figure 2:
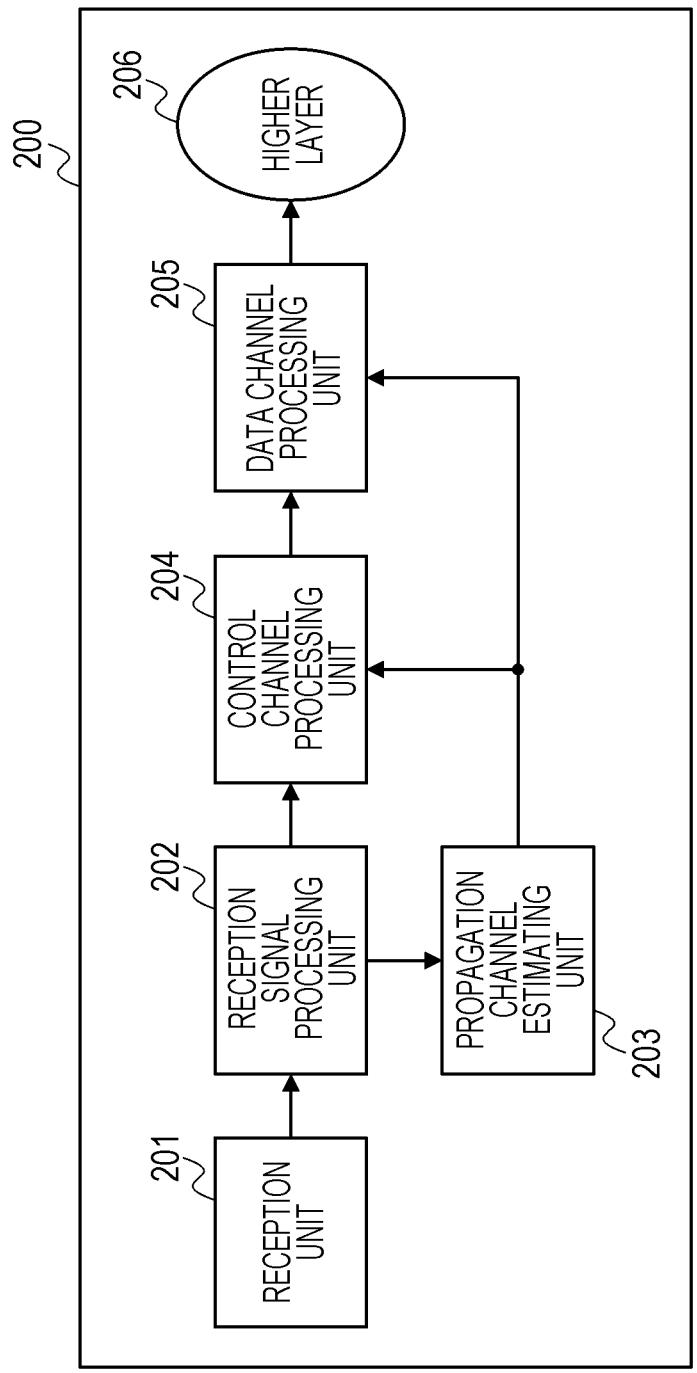
FIG. 2 is a schematic block diagram illustrating a configuration of a terminal according to the first embodiment of the present invention.

FIG. 2 is a schematic block diagram illustrating a configuration of the terminal 200 according to the first embodiment of the present invention. In FIG. 2, the terminal 200 includes a reception unit 201, a reception signal processing unit 202, a propagation channel estimating unit 203, a control channel processing unit 204, a data channel processing unit 205, and a higher layer 206.

The reception unit 201 receives the signal transmitted from the base station 100, using the reception antennas of which the number is one or a plurality (number of reception antenna ports), and performs temporal frequency conversion processing according to conversion processing from a radio frequency to a baseband signal, removal of added guard intervals, FFT (Fast Fourier Transform) and so forth.

The reception signal processing unit 202 demaps (separates) the signal mapped at the base station 100. Specifically, the reception signal processing unit 202 demaps the first control channel and/or second control channel, and/or data channel, and outputs the signal to the control channel processing unit 204. Also, the reception signal processing unit 202 demaps the multiplexed cell-specific reference signal and/or terminal-specific reference signal, and outputs the demapped signals to the propagation channel estimating unit 203.

The propagation channel estimating unit 203 performs estimation of a propagation channel as to the resources of the first control channel and/or second control channel and/or data channel based on the cell-specific reference signal and/or terminal-specific reference signal. The propagation channel estimating unit 203 outputs an estimation result of estimation of a propagation channel to the control channel processing unit 204 and data channel processing unit 205. The propagation channel estimating unit 203 estimates fluctuations in the amplitude and phase (frequency response, transfer function) at each resource element as to each reception antenna port of each layer (rank, spatial multiplexing) based on the terminal-specific reference signal multiplexed into the data channel and/or second control channel (propagation channel estimation) to obtain a propagation channel estimation value. Also, the propagation channel estimating unit 203 estimates fluctuations in the amplitude and phase at each resource element as to each reception antenna port of each transmission antenna port based on the cell-specific reference signal multiplexed into the first control channel to obtain a propagation channel estimation value.

The control channel processing unit 204 searches for a control channel addressed to the terminal 200 mapped to the first control channel area and/or second control channel area. Here, the control channel processing unit 204 sets the first control channel area and/or second control channel area as a control channel area for searching for a control channel. Setting of the second control channel area is performed through control information of a higher layer which the base station 100 informs to the terminal 200 (e.g., RRC (Radio Resource Control) signaling). For example, setting of the second control channel area is control information for setting the second control channel as the terminal-specific setting information of the second control channel, and is setting information specific to the terminal 200. Details of setting of the second control channel area will be described later. Also, in the case that a plurality of mapping methods of the second control channel as to the second control channel area are defined, the control channel processing unit 204 performs processing by switching the mapping method based on parameters of the base station and/or terminal and/or control channel, and so forth. Details thereof will be described later.

For example, in the case that the base station 100 performs informing of the terminal-specific setting information of the second control channel, and the second control channel area is set, the control channel processing unit 204 searches for a control channel addressed to the terminal 200 mapped to the second control channel area. In this case, the control channel processing unit 204 may further search some areas in the first control channel area. For example, the control channel processing unit 204 may further search a cell-specific search area in the first control channel area. Also, in the case that the base station 100 does not inform the terminal-specific setting information of the second control channel, and the second control channel area is not set, the control channel processing unit 204 searches for a control channel addressed to the terminal 200 mapped to the first control channel area.

Here, in the case of searching for a control channel addressed to the terminal 200 mapped to the second control channel area, the control channel processing unit 204 uses the terminal-specific reference signal to demodulate a potential control channel. Also, in the case of searching for a control channel addressed to the terminal 200 mapped to the first control channel area, the control channel processing unit 204 uses the cell-specific reference signal to demodulate a potential control channel.

Specifically, the control channel processing unit 204 performs demodulation and decoding processing to sequentially search part or all of control channel candidates obtained based on the type of control information, the position of the resource to be mapped, the size of the resource to be mapped, the aggregation level, or the like. The control channel processing unit 204 uses error detection code (e.g., CRC (Cyclic Redundancy Check) code) added to control information, as a method for deciding whether or not the control information is control information addressed to the terminal 200. This search method will also be referred to as blind decoding.

In the case of having detected a control channel addressed to the terminal 200, the control channel processing unit 204 identifies control information mapped to the detected control channel. This control information is shared throughout the entire terminal 200 (including a higher layer), and is used for various controls at the terminal 200 such as reception processing of a downlink data channel, transmission processing of an uplink data channel or control channel, transmission power control at the upper link, and so forth.

In the case that control information including assignment information of a downlink data channel is mapped to the detected control channel, the control channel processing unit 204 outputs the data channel demapped at the reception signal processing unit 202 to the data channel processing unit 205.

The data channel processing unit 205 performs propagation channel compensation processing (filter processing) employing the propagation channel estimation result input from the propagation channel estimating unit 203, layer demapping processing, demodulation processing, descramble processing, error correction decoding processing, or the like on the data channel input from the control channel processing unit 204, and outputs to the higher layer 206. Note that a resource element in which the terminal-specific reference signal is not mapped is subjected to interpolation or averaging or the like in the frequency direction and temporal direction based on a resource element in which the terminal-specific reference signal is mapped. Estimation of a propagation channel is also performed. In the case of the propagation channel compensation processing, the data channel processing unit 205 performs compensation of the propagation channel on the input data channel using the estimated propagation channel estimation value to detect (restore) a signal for each layer based on the information data. Examples of a detecting method thereof include equalization of ZF (Zero Forcing) norm and MMSE (Minimum Mean Square Error) norm, turbo equalization, and interference elimination. In the case of the layer demapping processing, the data channel processing unit 205 performs demapping processing on the signal for each layer into each information data. The subsequent processing is performed for each information data. In the case of the demodulation processing, the data channel processing unit 205 performs demodulation based on the employed modulation format. In the case of the descramble processing, the data channel processing unit 205 performs descramble processing based on the employed scramble code. In the case of the decoding processing, the data channel processing unit 205 performs error correction decoding processing based on the encoding method to be subjected.

Figure 3:
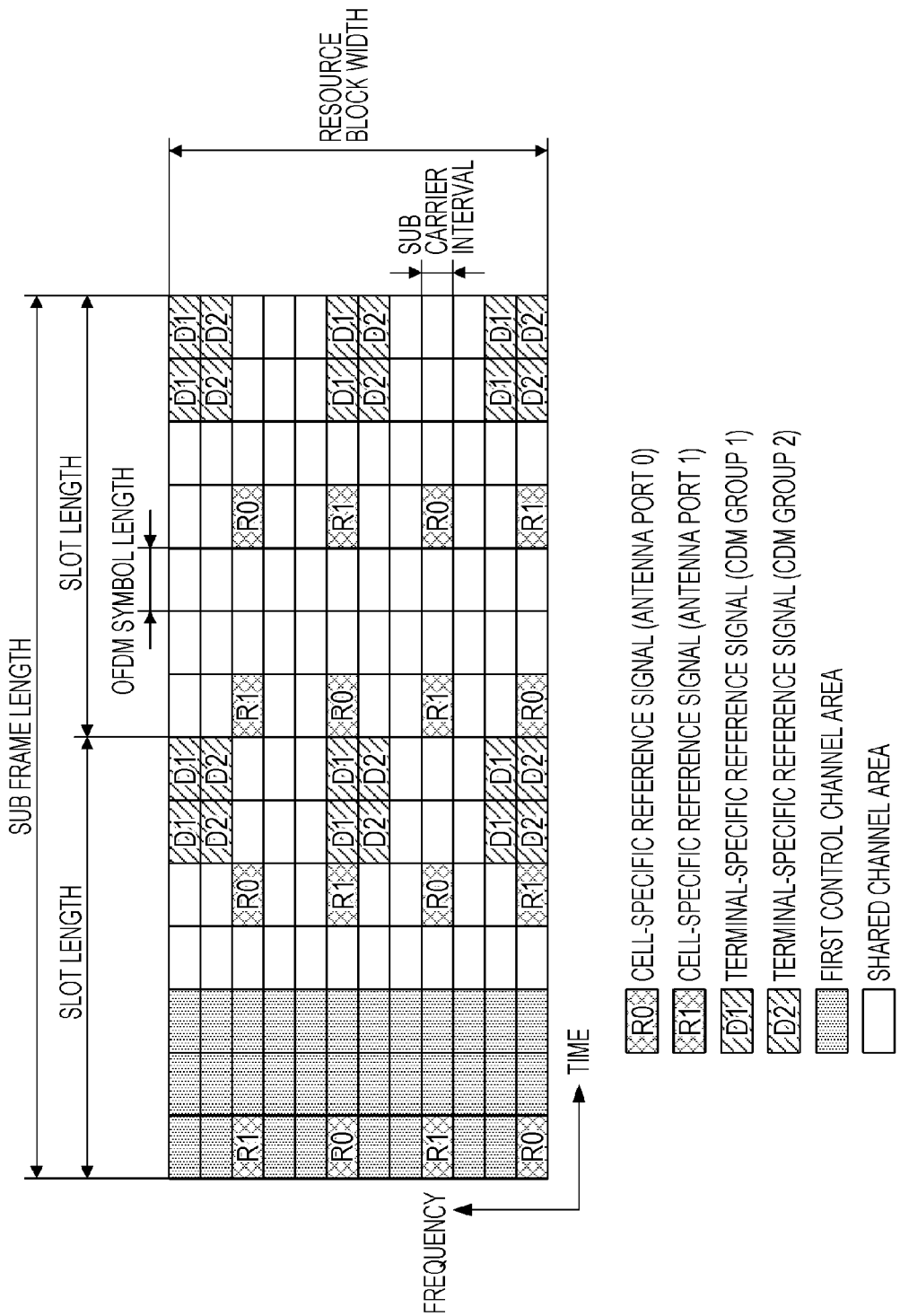
FIG. 3 is a diagram illustrating an example of one resource block pair mapped by a base station.

FIG. 3 is a diagram illustrating an example of one resource block pair to be mapped by the base station 100. One resource block is configured of an area in a predetermined frequency direction and an area in predetermined temporal direction, and one resource block pair is situated consecutively in the temporal direction. FIG. 3 represents two resource blocks (RB; Resource Block), and one resource block is configured of 12 sub carriers in the frequency direction and seven OFDM symbols in the temporal direction. Each sub carrier of one OFDM symbol will be referred to as a resource element. Resource block pairs are arrayed in the frequency direction, and the number of the resource block pairs can be set for each base station. For example, the number of the resource block pairs thereof can be set to 6 to 110. The width in the frequency direction at this time will be referred to as a system bandwidth. Also, the temporal direction of a resource block pair will be referred to as a sub frame. Of each sub frame, each of first seven OFDM symbols and second seven OFDM symbols in the temporal direction will also be referred to as a slot. Also, the resource block pairs will also be simply referred to as resource blocks in the following description.

In FIG. 3, of shaded resource elements, R0 to R1 indicate cell-specific reference signals of antenna ports 0 to 1, respectively. Here, the cell-specific reference signals illustrated in FIG. 3 are for a case of two antenna ports, but the number thereof can be changed. For example, a cell-specific reference signal for one antenna port or four antenna ports can be mapped.

Now, a reference signal for measurement of a propagation channel state can be set as a cell-specific reference signal different from the cell-specific reference signals of the antenna ports 0 to 1 illustrated in FIG. 3. The reference signal for measurement of a propagation channel state can be set as a reference signal corresponding to eight antenna ports of antenna ports 15 to 22, for example. Also, the reference signal for measurement of a propagation channel state can be mapped to some sub frames, and for example, can be mapped for each of the plurality of sub frames. The base station 100 sets the reference signal for measurement of a propagation channel state as terminal-specific control information as to the terminal 200 through RRC signaling. The terminal 200 generates feedback information using the cell-specific reference signals and/or reference signal for measurement of a propagation channel state, for antenna ports 0 to 1, based on the settings from the base station 100.

In FIG. 3, of the shaded resource elements, D1 to D2 indicate the terminal-specific reference signals of CDM (Code Division Multiplexing) group 1 to CDM group 2. Also, each of the terminal-specific reference signals of the CDM group 1 and CDM group 2 is subjected to code division multiplexing within each CDM group using an orthogonal code such as Walsh code or the like. Also, the terminal-specific reference signals of the CDM group 1 and CDM group 2 are mutually subjected to frequency division multiplexing (FDM) among the CDM groups. Here, the terminal-specific reference signals can be mapped up to the maximum rank 8 using eight antenna ports (antenna ports 7 to 14) according to the control channel and data channel to be mapped to the resource block pair thereof. As for the terminal-specific reference signals, the spread code length of CDM or the number of resource elements to be mapped can be changed according to the rank number to be mapped.

For example, terminal-specific reference signals in the case that the rank number is 1 to 2 are configured of the spread code lengths of two chips as antenna ports 7 to 8, and are mapped to the CDM group 1. Terminal-specific reference signals in the case that the rank number is 3 to 4 are configured of the spread code lengths of two chips as antenna ports 9 to 10 in addition to the antenna ports 7 to 8, and are mapped to the CDM group 2. Terminal-specific reference signals in the case that the rank number is 5 to 8 are configured of the spread code lengths of four chips as antenna ports 7 to 14, and are mapped to the CDM group 1 and CDM group 2.

Also, the orthogonal code of each antenna port of a terminal-specific reference signal is further superimposed with a scramble code. This scramble code is generated based on the control information informed from the base station 100. For example, the scramble code is generated from a pseudo-noise series generated based on the cell ID and scramble ID informed from the base station 100. The scramble ID is a value indicating 0 or 1, for example. Also, the employed scramble ID and antenna port can be subjected to joint coding, and information indicating these can also be converted into indexes.

Of the shaded resource elements, an area configured of the first to third top OFDM symbols is set as an area where the first control channel is situated (first control channel area). Also, an area where the first control channel is situated is mapped to the front OFDM symbols within a sub frame, and a predetermined number of OFDM symbols can be set for each sub frame. The predetermined number of OFDM symbols where the first control channel is situated is broadcast (informed) as cell-specific control information through a PCFICH (Physical Control Format Indicator Channel).

Also, resource elements filled with white indicate an area where the shared channel is situated (shared channel area). The area where the shared channel is situated is mapped to the rear OFDM symbols within a sub frame, that is, OFDM symbols different from the OFDM symbols where the first control channel is situated within the sub frame, and a predetermined number of OFDM symbols can be set for each sub frame. Note that all or a part of the area where the shared channel is situated can be mapped to fixed predetermined OFDM symbols regardless of the first control channel area in the sub frame thereof. For example, an area where the second control channel is situated (second control channel area) may be mapped to the fourth to fourteenth OFDM symbols within a sub frame regardless of the first control channel area in the sub frame thereof. Also, an area where the shared channel is situated can be set for each resource block pair.

Now, the resource blocks can be changed in the number thereof according to the frequency bandwidth (system bandwidth) used by the communication system. For example, 6 to 110 resource blocks can be employed, and units thereof will also be referred to as component carriers. Further, the base station can set a plurality of component carriers to a terminal using frequency aggregation. For example, the base station can configure one component carrier with 20 MHz, and set five component carriers consecutively and/or non-consecutively in the frequency direction to a terminal, and can set 100 MHz as a total bandwidth which the communication system can employ.

Figure 4:
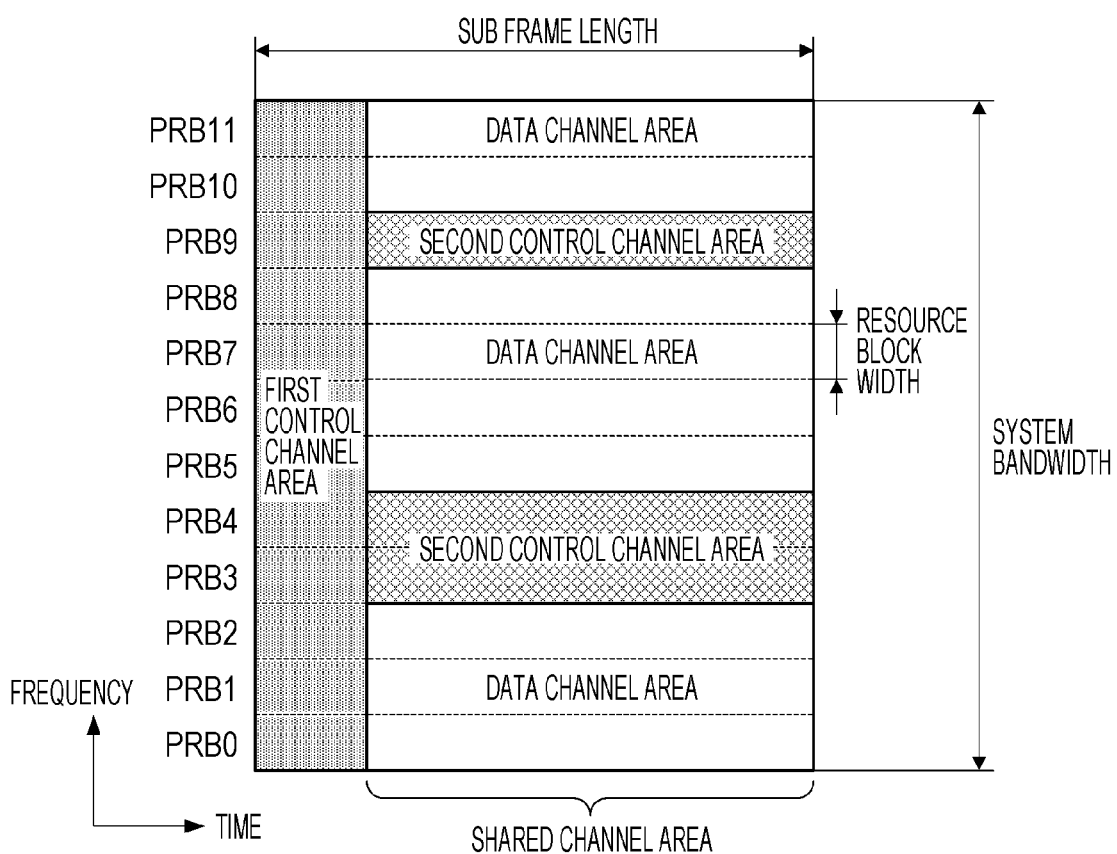
FIG. 4 is a diagram illustrating an example of channels mapped by a base station.

FIG. 4 is a diagram illustrating an example of channels to be mapped by the base station 100. FIG. 4 illustrates a case where a frequency bandwidth configured of 12 physical resource block pairs (PRB; Physical Resource Block) is taken as the total system bandwidth. The PDCCH which is the first control channel is situated at the first to third top OFDM symbols in a sub frame. The frequency direction of the first control channel is situated across the total system bandwidth. Also, the shared channel is situated at OFDM symbols other than the first control channel in the sub frame.

Now, details of the configuration of a PDCCH will be described. The PDCCH is configured of a plurality of control channel elements (CCE). The number of CCEs to be used for each downlink component carrier depends on the downlink component carrier bandwidth, the number of OFDM symbols configuring a PDCCH, and the number of transmission antenna ports of downlink cell-specific reference signals according to the number of transmission antennas of the base station 100 to be used for communication. The CCEs are configured of a plurality of downlink resource elements (resource defined with one OFDM symbol and one sub carrier).

The CCEs to be used between the base station 100 and terminal 200 are appended with a number for identifying the corresponding CCE. Numbering of the CCEs is performed based on a predetermined rule. Here, CCE_t indicates a CCE with a CCE number t. A PDCCH is configured of an aggregation made up of a plurality of CCEs (CCE Aggregation). The number of CCEs configuring this aggregation will be referred to as "CCE aggregation level" (CCE aggregation level). The CCE aggregation level configuring a PDCCH is set at the base station according to a coding rate set to the PDCCH, and the number of bits of the DCI format included in the PDCCH. Note that a combination of CCE aggregation levels that may be used for the terminal is determined in advance. Also, an aggregation made up of n CCEs will be referred to as "CCE aggregation level n".

One resource element group is configured of four downlink resource elements having an adjacent frequency area. Further, one CCE is configured of nine different resource element groups scattered in frequency areas and time areas.

Specifically, interleaving is performed on all of the downlink component carriers in increments of resource element groups using a block interleaver for all of the numbered resource element groups, and one CCE is configured of nine resource element groups having a consecutive number after interleaving.

An area SS (Search Space) for detecting a PDCCH is set to each terminal. The SS is configured of a plurality of CCEs. The SS is configured of a plurality of CCEs having a consecutive number from a CCE having the smallest number, and the number of the plurality of CCEs having a consecutive number is determined in advance. The SS of each CCE aggregation level is configured of an aggregation of a plurality of PDCCH candidates. The SS is classified into a CSS (Cell-specific SS) having a common number within a cell from the smallest CCE, and a USS (UE-specific SS) of which the number is specific to a terminal from the smallest CCE. There can be situated in the CSS a PDCCH to which control information to be read by a plurality of terminals such as system information, information regarding paging, or the like is assigned, or a PDCCH to which downlink/uplink grant indicating fallback or random access instruction for a lower transmission format is assigned.

The base station 100 transmits the PDCCH using one or more CCEs within an SS to be set at the terminal 200. The terminal 200 performs decoding of a reception signal using one or more CCEs within the SS, and performs processing for detecting a PDCCH addressed to itself (referred to as blind decoding). The terminal 200 sets a different SS for each CCE aggregation level. Thereafter, the terminal 200 performs blind decoding using a combination of CCEs determined in advance within a different SS for each CCE aggregation level. In other words, the terminal 200 performs blind decoding on each PDCCH candidate within a different SS for each CCE aggregation level. This series of processing at the terminal 200 will be referred to as monitoring of a PDCCH.

The second control channel (E-PDCCH, PDCCH on PDSCH, Enhanced PDCCH) to be mapped to the second control channel area is situated in OFDM symbols other than the first control channel area. The shared channel area is situated in different resource blocks. Also, a resource block where the shared channel area can be situated is set for each terminal. Also, the start position of an OFDM symbol where the second control channel is situated can be set by the same method as with the shared channel. Specifically, the start position is set by the base station 100 setting some resources of the first control channel area as a PCFICH, and mapping information indicating the number of OFDM symbols of the first control channel area.

Also, the start position of OFDM symbols where the second control channel area is situated can be defined beforehand, and for example, can be defined as the fourth top OFDM symbol in a sub frame. At this time, in the case that the number of OFDM symbols of the first control channel area is equal to or smaller than two, no signal is mapped to the second through third OFDM symbols in a resource block pair where the second control channel area is situated, and null is set to these symbols. Note that another control channel or data channel can further be mapped to the resource set as null. Also, the start position of OFDM symbols where the second control channel area is set can be set through the control information of the higher layer. Also, the sub frames illustrated in FIG. 4 are subjected to time multiplexing, and the second control channel area can be set for each sub frame.

In the case that the base station 100 informs a control channel to the terminal 200 through the second control channel area, the base station 100 sets monitoring of the second control channel to the terminal 200, and maps the control channel for the terminal 200 to the second control channel area. Also, in the case that the base station 100 informs a control channel to the terminal 200 through the first control channel area, the base station 100 maps the control channel for the terminal 200 to the first control channel area without setting monitoring of the second control channel to the terminal 200.

On the other hand, in the case that monitoring of the second control channel has been set by the base station 100, the terminal 200 subjects the control channel addressed to the terminal 200 in the second control channel area to blind decoding. Also, in the case that monitoring of the second control channel has not been set by the base station 100, the terminal 200 does not subject the control channel addressed to the terminal 200 in the second control channel area to blind decoding.

Hereinafter, description will be made regarding control channels to be mapped to the second control channel area. The control channels to be mapped to the second control channel area are processed for each control information for one terminal, and in the same way as with the data channel, scramble processing, modulation processing, layer mapping processing, precoding processing, or the like is performed on the control channels. Also, the control channels to be mapped to the second control channel area are subjected to precoding processing specific to the terminal 200 along with the terminal-specific reference signal. At this time, it is desirable to perform the precoding processing with precoding weighting suitable for the terminal 200.

Also, the control channels to be mapped to the second control channel area can be mapped including different control information between the front slot (first slot) and the rear slot (second slot) in a sub frame. For example, a control channel including assignment information in the downlink shared channel (downlink assignment information) which the base station 100 transmits to the terminal 200 is mapped to the front slot in the sub frame. Also, a control channel including assignment information in the uplink shared channel (uplink assignment information) which the terminal 200 transmits to the base station 100 is mapped to the rear slot in the sub frame. Now, an arrangement may be made wherein a control channel including uplink assignment information which the base station 100 transmits to the terminal 200 is mapped to the front slot in the sub frame, and a control channel including downlink assignment information which the terminal 200 transmits to the base station 100 is mapped to the rear slot in the sub frame.

A data channel as to the terminal 200 and/or another terminal may be mapped to the front and rear slots in the second control channel area. Also, a control channel as to the terminal 200 and/or another terminal may be mapped to the front and rear slots in the second control channel area.

Also, terminal-specific reference signals in the same way as with the data channel are multiplexed into a control channel to be mapped to the second control channel area by the base station 100. The terminal 200 performs demodulation processing on the control channel to be mapped to the second control channel area using the terminal-specific reference signals to be multiplexed. Also, part or all of the terminal-specific reference signals of the antenna ports 7 to 14 are employed. At this time, the control channel to be mapped to the second control channel area can be MIMO-transmitted using the plurality of antenna ports.

For example, the terminal-specific reference signals in the second control channel area are transmitted using a predetermined antenna port and scramble code. Specifically, the terminal-specific reference signals in the second control channel area are generated using a predetermined antenna port 7 and scramble ID.

Also, for example, the terminal-specific reference signals in the second control channel area are generated using the antenna port and scramble ID informed through RRC signaling, signaling according to the first control channel, or signaling according to the second control channel in the prior sub frame. As an example, one of the antenna port 7 and antenna port 8 is informed as an antenna port to be employed by the terminal-specific reference signals in the second control channel area through RRC signaling, signaling according to the first control channel, or signaling according to the second control channel in the prior sub frame. As another example, one value of 0 to 3 is informed as a scramble ID to be employed by the terminal-specific reference signals in the second control channel area through RRC signaling, signaling according to the first control channel, or signaling according to the second control channel in the prior sub frame. Note that, in addition to the terminal-specific reference signals, cell-specific reference signals may be employed at the time of demodulation of the second control channel.

Hereinafter, description will be made regarding an example of a method for the base station 100 setting the second control channel to the terminal 200 (setting method of the second control channel area, setting method of monitoring of the second control channel), in which the setting of the second control channel area and setting of a transmission mode implicitly indicate setting of monitoring of the second control channel. The base station 100 informs the terminal 200 of terminal-specific setting information as to a radio resource (RadioResouceConfigDedicated) through the control information of the higher layer, thereby setting the second control channel. The terminal-specific setting information as to a radio resource is control information to be used for performing setting/modification/release of a resource block, terminal-specific setting as to a physical channel, or the like.

The base station 100 informs the terminal 200 of the terminal-specific setting information for a radio resource. The terminal 200 performs terminal-specific setting for a radio resource based on the terminal-specific setting information for a radio resource from the base station 100, and informs the base station 100 of setting completion of the terminal-specific setting information as to the radio resource.

The terminal-specific setting information for a radio resource includes terminal-specific setting information (PhysicalConfigDedicated) for a physical channel. The terminal-specific setting information for a physical channel is control information for defining terminal-specific setting for a physical channel. The terminal-specific setting information for a physical channel includes setting information of a transmission path state report (CQI-ReportConfig), terminal-specific setting information of antenna information (AntennaInfoDedicated), and terminal-specific setting information of the second control channel (EPDCCH-ConfigDedicated). The setting information of a transmission path state report is employed for defining setting information for reporting a transmission path state in the downlink. The terminal-specific setting information of antenna information is employed for defining terminal-specific antenna information at the base station 100. The terminal-specific setting information of the second control channel is employed for defining terminal-specific setting information of the second control channel. Also, the terminal-specific setting information of the second control channel is informed to and set to the terminal 200 as control information specific to the terminal 200, and accordingly, the second control channel area to be set is set as an area specific to the terminal 200.

The setting information of a transmission path state report includes setting information of a non-periodical transmission path state report (CQI-ReportModeAperiodic), and setting information of a periodical transmission path state report (CQI-ReportPeriodic). The setting information of a non-periodical transmission path state report is setting information for non-periodically reporting a transmission path state in the downlink through the uplink shared channel (PUSCH; Physical Uplink Shared Channel). The setting information of a periodical transmission path state report is setting information for periodically reporting a transmission path state in the downlink through the uplink control channel (PUCCH; Physical Uplink Control Channel).

The terminal-specific setting information of antenna information includes a transmission mode (transmissionMode). The transmission mode is information indicating a transmission method for the base station 100 communicating with the terminal 200. For example, the transmission mode is defined as transmission modes 1 to 10 in advance. The transmission mode 1 is a transmission mode employing a single antenna port transmission format employing an antenna port 0. The transmission mode 2 is a transmission mode employing a transmission diversity format. The transmission mode 3 is a transmission mode employing a cyclic delay diversity format. The transmission mode 4 is a transmission mode employing a closed-loop spatial multiplexing format. The transmission mode 5 is a transmission mode employing the multiuser MIMO format. The transmission mode 6 is a transmission mode employing the closed-loop spatial multiplexing format employing a single antenna port. The transmission mode 7 is a transmission mode employing a single antenna port transmission format employing an antenna port 5. The transmission mode 8 is a transmission mode employing the closed-loop spatial multiplexing format employing antenna ports 7 to 8. The transmission mode 9 is a transmission mode employing the closed-loop spatial multiplexing format employing antenna ports 7 to 14. Also, the transmission modes 1 to 9 will also be referred to as a first transmission mode.

The transmission mode 10 is defined as a transmission mode different from the transmission modes 1 to 9. For example, the transmission mode 10 can be taken as a transmission mode employing the CoMP format. Here, extension according to introduction of the CoMP format includes optimization and improved accuracy of a transmission path state report (e.g., introduction of precoding information suitable at the time of CoMP communication, phase difference information between base stations, and so forth), and so forth. Also, the transmission mode 10 can be taken as a transmission mode employing a communication format extended (advanced) from the multiuser MIMO format which can be realized by the communication formats described in the transmission modes 1 to 9. Here, extension of the multiuser MIMO format includes optimization and improved accuracy of a transmission path state report (e.g., introduction of CQI (Channel Quality Indicator) information and so forth which is suitable for multiuser MIMO communication), improvement in orthogonality between terminals to be multiplexed into the same resource, and so forth.

Also, the transmission mode 10 can be taken as a transmission mode employing the CoMP format and/or extended multiuser MIMO format in addition to all or some communication formats described in the transmission modes 1 to 9. For example, the transmission mode 10 can be taken as a transmission mode employing the CoMP format and/or extended multiuser MIMO format in addition to the communication format described in the transmission mode 9. Also, the transmission mode 10 can be taken as a transmission mode whereby a plurality of reference signals for measurement of a transmission path state (CSI-RS; Channel State Information-RS) can be set. The transmission mode 10 will also be referred to as a second transmission mode.

Note that when transmitting a data channel to a terminal, to which the transmission mode 10 enabling use of a plurality of transmission formats has been set, the base station 100 can perform communication without informing the terminal of which of the plurality of transmission formats has been employed. Specifically, even if the transmission mode 10 enabling use of a plurality of transmission formats has been set, the terminal 200 can perform communication at the time of receiving the data channel without informing the terminal 200 of which of the plurality of transmission formats has been employed.

Here, the second transmission mode is a transmission mode whereby the second control channel can be set. Specifically, in the case of having set the first transmission mode to the terminal 200, the base station 100 maps the control channel for the terminal 200 to the first control channel area. Also, in the case of having set the second transmission mode to the terminal 200, the base station 100 maps the control channel for the terminal 200 to the first control channel area or second control channel area. On the other hand, in the case that the terminal 200 has been set to the first transmission mode by the base station 100, the terminal 200 performs blind decoding on the first control channel. Also, in the case that the terminal 200 has been set to the second transmission mode by the base station 100, the terminal 200 performs blind decoding on one of the first control channel and second control channel.

Also, in the case that the terminal 200 has been set to the second transmission mode, the terminal 200 sets a control channel to be subjected to blind decoding based on whether or not the terminal-specific setting information of the second control channel has been set by the base station 100. Specifically, in the case that the terminal 200 has been set to the second transmission mode by the base station 100, and the terminal-specific setting information of the second control channel has been set, the terminal 200 performs blind decoding on the first control channel and/or second control channel. Also, in the case that the terminal 200 has been set to the second transmission mode by the base station 100, and the terminal-specific setting information of the second control channel has not been set, the terminal 200 performs blind decoding on the first control channel.

The terminal-specific setting information of the second control channel includes sub frame setting information (EP-DCCH-SubframeConfig-r11) of the second control channel. The sub frame setting information of the second control channel is used for defining sub frame information for setting the second control channel. The sub frame setting information of the second control channel includes a sub frame setting pattern (subframeConfigPattern-r11), and second control channel setting information (epdcch-Config-r11).

The sub frame setting pattern is information indicating sub frames to which the second control channels are set. For example, the sub frame setting pattern is information having an n-bit bitmap format. Information indicated at each bit indicates whether or not the sub frame is a sub frame to be set as the second control channel. That is to say, the sub frame setting pattern can be set with n sub frames as a cycle. At this time, a predetermined sub frame where a synchronizing signal, a broadcast channel, and so forth are mapped, can be excluded. Specifically, a remainder obtained by dividing the sub frame number defined in each sub frame by n corresponds to each bit of the sub frame setting pattern. For example, a value of 8 or 40 or the like is defined as n beforehand. In the case that information for a certain sub frame in the sub frame setting pattern is "1", the sub frame thereof is set as the second control channel. In the case that information for a certain sub frame in the sub frame setting pattern is "0", the sub frame thereof is not set as the second control channel. Also, a predetermined sub frame where a synchronizing signal for the terminal 200 being synchronized with the base station 100, a broadcast channel for broadcasting the control information of the base station 100, and so forth are mapped can be kept from being set beforehand as the second control channel. Also, in the case of another example of the sub frame setting pattern, the patterns of sub frames to be set as the second control channel are converted into indexes beforehand, and information indicating the indexes thereof is defined as the sub frame setting pattern.

The setting information of the second control channel includes a resource allocation type (resouceAllocationType-r11), and resource assignment information (resourceBlockAssignment-r11).

The resource allocation type is information indicating the format (type) of information for specifying a resource block to be set as the second control channel area within a sub frame. Also, the resource assignment information is information for specifying a resource block to be set as the second control channel, and is defined based on the format of the resource allocation type.

For example, the resource allocation type can define a plurality of resource assignment information as types 0 to 2. The resource assignment information is control information for assigning the second control channel to a VRB (Virtual Resource Block). In the case that the resource allocation type is type 0, the resource assignment information is information having a bitmap format that can be assigned for each resource block group to be defined with a plurality of consecutive VRBs as units. Note that the number of VRBs of a resource block group can be defined according to the system bandwidth. In the case that the resource allocation type is type 1, the resource assignment information is information having a bitmap format to which the second control channel can be assigned for each VRB within a plurality of resource block group subsets. Each VRB within a resource block group is defined as one of the plurality of the resource block group subsets. The resource assignment information also includes information indicating a resource block group subset to be selected. In the case that the resource allocation type is type 1, the resource assignment information is information indicating a VRB serving as start of allocation, and information indicating the number of VRB to be allocated, in consecutive VRBs.

Here, the number of VRBs is the same as the number of PRBs. A plurality of types of VRBs are defined. Mapping from a VRB to a PRB (PRB mapping) is defined according to these types. In the case of a Localized type, mapping is performed so that a VRB number (position of a VRB) agrees with a PRB number (number of a PRB). Here, the PRB numbers are sequentially numbered from a PRB having a low frequency. Also, in the case of a Distributed type, mapping is performed in accordance with a predetermined method so that the VRB numbers are dispersed (randomized) as to the PRB numbers. In the case of the Distributed type, hopping can be performed between slots, and the second slot of each VRB can be hopped to a different VRB. Also, whether or not the second slot is subjected to hopping may be switched by being informed by RRC signaling or PDCCH signaling, or may be defined in advance. Hereinafter, description will be made regarding a case where it has been defined beforehand that the second slot is not subjected to hopping.

Also, in the case that the resource allocation type is type 0 and type 1, PRB mapping is applied to the Localized type alone. In the case that the resource allocation type is type 2, PRB mapping is applied to the Localized type or Distributed type. The resource allocation type included in the setting information of the second control channel includes control information (PRB mapping information) regarding PRB mapping. For example, the resource allocation type can be taken as control information indicating one of type 0, type 1, type 2 Localized, and type 2 Distributed.

As described above, in the case of setting the second control channel to the terminal 200, the base station 100 informs of the terminal-specific setting information for a radio resource, including the terminal-specific setting information of the second control channel using RRC signaling. Also, in the case of changing the second control channel set to the terminal 200, the base station 100 informs of terminal-specific setting information for a radio resource, including the terminal-specific setting information of the second control channel of which the parameter has been changed similarly using RRC signaling. Also, in the case of releasing the second control channel set to the terminal 200, the base station 100 informs of this similarly using RRC signaling. For example, the base station 100 informs of terminal-specific setting information for a radio resource not including the terminal-specific setting information of the second control channel. Also, the base station 100 may inform of control information for releasing the terminal-specific setting information of the second control channel.

In the case of the above example, a control channel for a terminal to be set to transmission modes 1 to 10 can be mapped to the first control channel area, and a control channel for a terminal set to transmission mode 10 can be mapped to the second control channel area. That is to say, the base station 100 can inform of a control channel through the first control channel area, regardless of the transmission mode set to the terminal 200. Also, in the case of setting the transmission mode 10 to the terminal 200, the base station 100 can inform of a control channel through the second control channel area. Therefore, the base station 100 can perform resource assignment scheduling in the light of communication formats which are available in the transmission mode 10.

In particular, in the case of the transmission mode 10 whereby the second control channel can be set, the base station 100 can apply the CoMP communication format or multiuser MIMO communication format or the like to the terminal 200, and accordingly, the base station 100 can perform resource assignment scheduling taking these communication formats into consideration. Also, the base station 100 can set the first control channel to all of the terminals, and accordingly, backward compatibility can be maintained for terminals to which the transmission mode 10 cannot be set. Also, notification of a control channel according to the first control channel area can be realized without setting the second control channel, so overhead of control information in RRC signaling can be reduced.

Hereinafter, details of the mapping method of the second control channels will be described. The base station 100 transmits one or a plurality of second control channels using one or a plurality of RBs. Also, the second control channel area is assigned for each RB pair.

Figure 5:
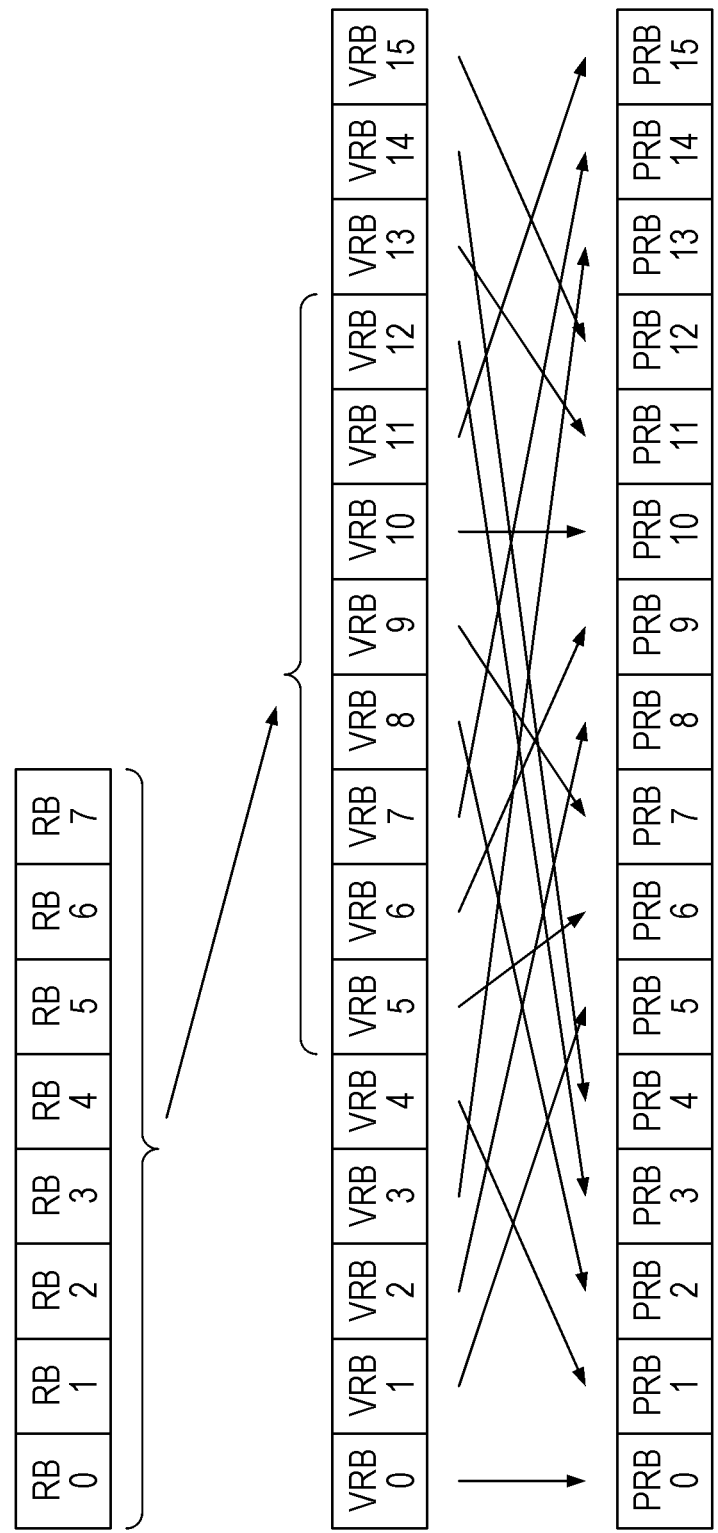
FIG. 5 is a diagram illustrating an example of mapping of a second control channel area.

FIG. 5 is a diagram illustrating an example of mapping of the second control channel area. The example in FIG. 5 illustrates a case where the second control channel area employing eight RBs (RB0 to RB7) is mapped to the system bandwidth employing 16 PRBs (PRB0 to PRB15). First, the second control channel area is mapped to a part or all of 16 VRBs (VRB0 to VRB15). Mapping to the VRBs is set according to the resource allocation type (resourceAllocationType-r11) and resource assignment information (resourceBlockAssignment-r11) included in the setting information of the second control channel to be informed through RRC signaling.

The example in FIG. 5 illustrates a case where the resource allocation type is type 2 Distributed. Also, with regard to the resource assignment information, a VRB serving as start is VRB5, and the number of VRBs to be assigned is eight. At this time, the second control channel area of RB0 to RB7 is mapped to the VRB5 to VRB12. The PRB mapping information is the Distributed type, and accordingly, the VRBs are mapped (interleaved) to the PRBs so as to be dispersed (randomized) by a predetermined method. In the case of the example in FIG. 5, the VRB5 to VRB12 are mapped to the PRB6, PRB9, PRB14, PRB2, PRB7, PRB10, PRB15, and PRB3, respectively.

Here, a plurality mapping methods of the second control channels to the second control channel area are defined. For example, as mapping methods of the second control channels to the second control channel area, there are defined a method wherein each of the second control channels is mapped with each slot (e.g., RB) in an RB pair as a unit, and a method wherein each of the second control channels is mapped with a plurality of divided resources as to each slot in an RB pair as a unit. That is to say, defined mapping methods of the second control channels to the second control channel area include a method wherein part of all of one second control channel is mapped to one RB, and a method wherein part or all of a plurality of second control channels are mapped to one RB. Also, the method wherein each of the second control channels is mapped with each slot (e.g., RB) in an RB pair as a unit can also be described as a method for mapping to resources of some resource blocks of the terminal-specific control channel area, or a method for mapping a terminal-specific control channel to resources of some resource blocks in the terminal-specific control channel area and also all of the resources in each resource block. Also, the method wherein each of the second control channels is mapped with a plurality of divided resources as to each slot in an RB pair as a unit can also be described as a method for mapping a terminal-specific control channel to resources of some resource blocks in the terminal-specific control channel area and also a part of the plurality of divided resources in each of the resource blocks.

Figure 6:
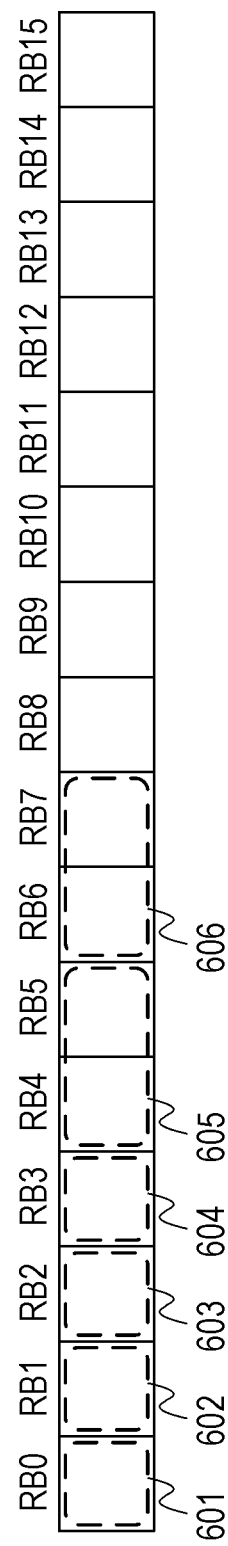
FIG. 6 is a diagram illustrating an example of mapping of second control channels to the second control channel area using 16 RBs.

FIG. 6 is a diagram illustrating an example of mapping of the second control channels to the second control channel area employing 16 RBs. FIG. 6 illustrates an example of mapping of the second control channels to the first slot. Note that the second control channels are also mapped to the second slot, in the same way as with the first slot, and also independently. In the case of the example illustrated in FIG.

6, each of the second control channels is mapped with each slot (e.g., RB) in an RB pair as a unit. For example, six second control channels are mapped to 16 RBs (RB0 to RB15). A second control channel 601 employing one RB is mapped to the RB0. A second control channel 602 employing one RB is mapped to the RB1. A second control channel 603 employing one RB is mapped to the RB2. A second control channel 604 employing one RB is mapped to the RB3. A second control channel 605 employing two RBs is mapped to the RB4 and RB5. A second control channel 606 employing two RBs is mapped to the RB6 and RB7. Note that data channels may also be mapped to RBs which have been set as the second control channel area but to which no second control channel is mapped, that is, VRBs/PRBs corresponding to the RB8 to RB15.

Figure 7:
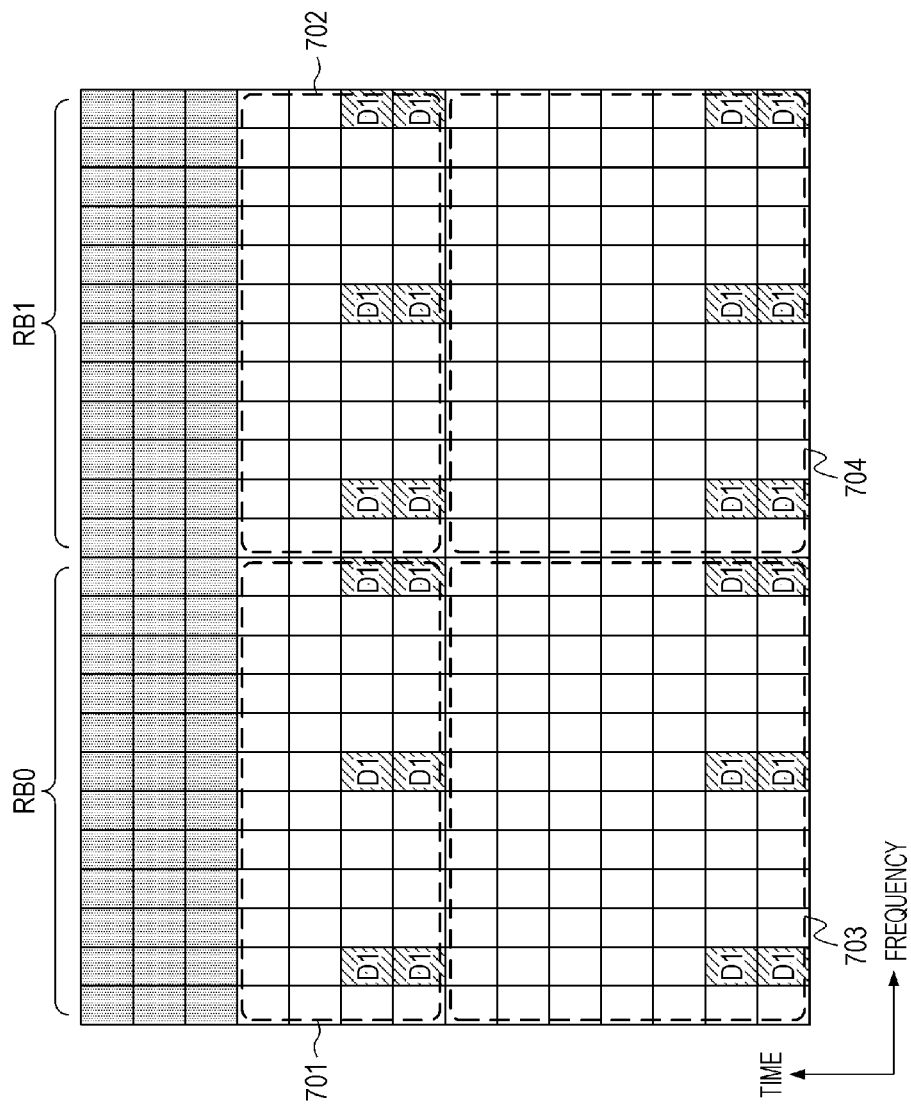
FIG. 7 is a diagram illustrating details of mapping of the second control channels.

FIG. 7 is a diagram illustrating details of mapping of the second control channels. FIG. 7 illustrates the RB pair of the RB0 and RB1 illustrated in FIG. 6. The three top OFDM symbols are the first control channel area. At the first slot a resource 701 is set to the RB0, and a resource 702 is set to the RB1. At the second slot a resource 703 is set to the RB0, and a resource 704 is set to the RB1. Also, the second control channel 601 illustrated in FIG. 6 is mapped to the resource 701, and the second control channel 602 is mapped to the resource 702. Also, each of the second control channels is multiplexed with a terminal-specific reference signal, and accordingly, the second control channels can be defined beforehand so as not to be mapped to a resource element to which a terminal-specific reference signal is mapped. Also, in the case that some signals such as a cell-specific reference signal, a reference signal for transmission path state measurement, control information, and so forth, are to be mapped to the second control channels, the second control channels can be defined beforehand so as not to be mapped to the resource elements to be mapped.

As described above, the method wherein each of the second control channels is mapped with each slot in an RB pair as a unit is employed as a mapping method of the second control channels to the second control channel area. Thus, a plurality of terminal-specific reference signals to be multiplexed to each slot in the RB pair thereof can be subjected to averaging or interpolation or the like at the time of performing demodulation processing on the second control channels, and estimation precision excelling in a propagation channel can be realized.

Figure 8:
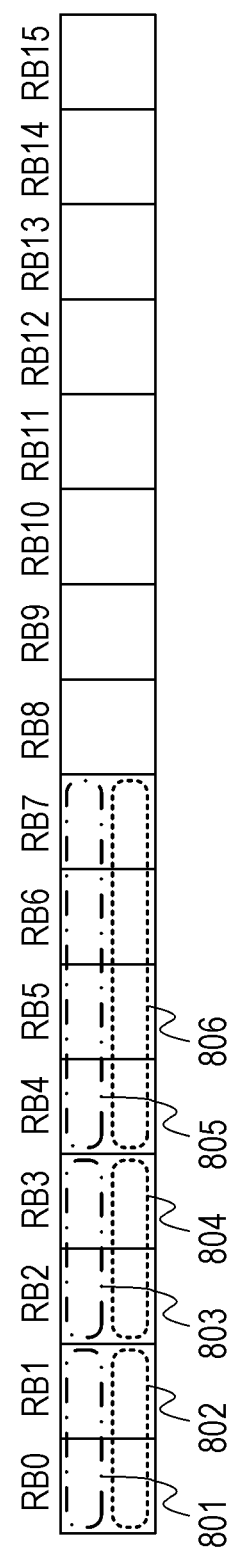
FIG. 8 is a diagram illustrating an example of mapping of second control channels to the second control channel area using 16 RBs.

FIG. 8 is a diagram illustrating an example of mapping of the second control channels to the second control channel area employing 16 RBs. FIG. 8 illustrates an example of mapping of the second control channels at the first slot. Note that the second control channels are mapped to the second slot in the same way as with the first slot, and also independently. In the case of the example illustrated in FIG. 8, each of the second control channels is mapped in units of the divided resources as to an RB (each slot in an RB pair). For example, six second control channels are mapped to 16 RBs (RB0 to RB15). A second control channel 801 having the amount of information equivalent to one RB, and a second control channel 802 having the amount of information equivalent to one RB, are mapped to part of the resources of the RB0 and RB1, respectively. A second control channel 803 having the amount of information equivalent to one RB, and a second control channel 804 having the amount of information equivalent to one RB are mapped to part of the resources of the RB2 and RB3, respectively. A second control channel 805 having the amount of information equivalent to two RBs, and a second control channel 806 having the amount of information equivalent to two RBs are mapped to part of the resources of the RB4 to RB7, respectively. Note that data channels may also be mapped to RBs which have been set as the second control channel area but to which no second control channel is mapped, that is, VRBs/PRBs corresponding to the RB8 to RB15.

Figure 9:
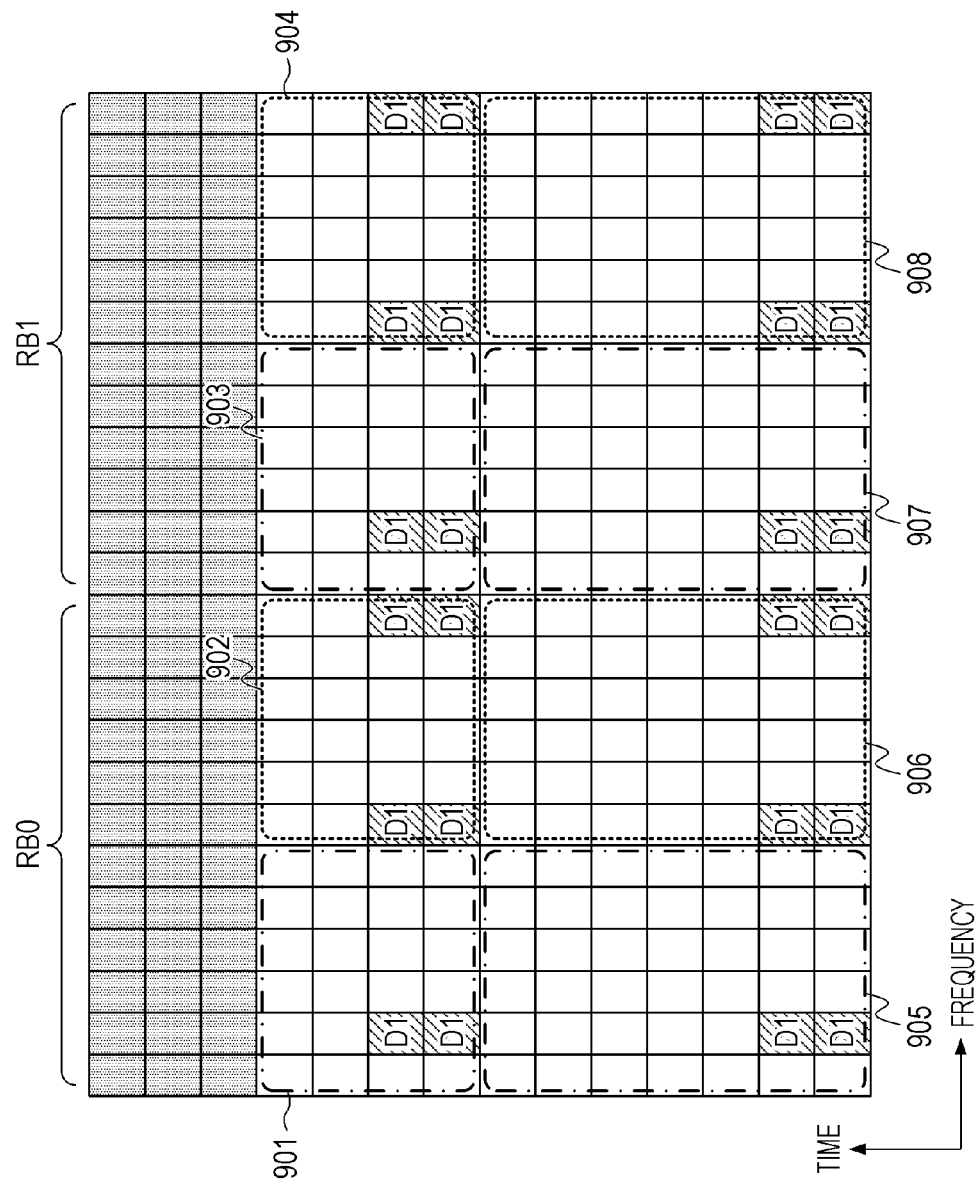
FIG. 9 is a diagram illustrating details of mapping of the second control channels.

FIG. 9 is a diagram illustrating details of mapping of the second control channels. FIG. 9 illustrates an RB pair of the RB0 and RB1 illustrated in FIG. 8. The three top OFDM symbols are the first control channel area. At the first slot, a resource 901 is set to six sub carriers on the left side of the RB0, a resource 902 is set to six sub carriers on the right side of the RB0, a resource 903 is set to six sub carriers on the left side of the RB1, and a resource 904 is set to six sub carriers on the right side of the RB1. At the second slot, a resource 905 is set to six sub carriers on the left side of the RB0, a resource 906 is set to six sub carriers on the right side of the RB0, a resource 907 is set to six sub carriers on the left side of the RB1, and a resource 908 is set to six sub carriers on the right side of the RB1. Also, units for mapping the second control channels are each of the resource 901 and resource 903, resource 902 and resource 904, resource 905 and resource 907, and resource 906 and resource 908. Also, the second control channel 801 illustrated in FIG. 8 is mapped to the resource 901 and resource 903, and the second control channel 802 is mapped to the resource 902 and resource 904. Now, an arrangement may be made wherein the second control channel 801 illustrated in FIG. 8 is mapped to the resource 901 and resource 904, and the second control channel 802 is mapped to the resource 902 and resource 903. Thus, each of the second control channels has the same number of terminal-specific reference signals, whereby precision of propagation channel estimation can be equalized.

Specifically, in the case that each RB set in the second control channel area is divided into N resources, and the second control channels are mapped to the divided resources thereof, the second control channels are mapped to the N divided resources within the plurality of RBs.

Also, each of the second control channels is multiplexed with a terminal-specific reference signal, and accordingly, the second control channels can be defined so as not to be mapped to a resource element to which a terminal-specific reference signal is mapped. Also, in the case that some signals such as a cell-specific reference signal, a reference signal for transmission path state measurement, control information, and so forth are mapped to the second control channels, the second control channels can be defined so as not to be mapped to a resource element to be mapped thereof. Here, a group of the divided resources can be regarded as one RB. Specifically, the resource 901 and resource 903 can be regarded as one RB, and the resource 902 and resource 904 can be regarded as one RB. Also, the RB numbers may be sequentially numbered from a resource having a low frequency included in the group of divided resources. For example, the RB configured of the resource 901 and resource 903 may be regarded as RB0, and the RB configured of the resource 902 and resource 904 may be regarded as RB1.

In the case of mapping the second control channels as illustrated in FIG. 9, demodulation processing of the terminal 200 as to the second control channels is performed using a terminal-specific reference signal to be mapped to each of resources where the second control channel to be subjected to the demodulation processing is mapped. Specifically, in the case of subjecting the second control channel to be mapped to the resource 901 and resource 903 to the demodulation processing, the terminal 200 performs the demodulation processing using a terminal-specific reference signal to be mapped to each of the resource 901 and resource 903.

Also, it is defined beforehand that the same precoding processing is performed on the resource to which each of the second control channel is mapped, whereby the terminal 200 can perform the demodulation processing assuming that the same precoding processing is performed on these resources. For example, the terminal 200 can perform averaging or interpolation or the like on the terminal-specific reference signal to be mapped to these resources. For example, at the time of performing the demodulation processing on the second control channels to be mapped to the resource 901 and resource 903, the terminal 200 can perform the demodulation processing assuming that the same precoding processing is performed on the resource 901 and resource 903.

Also, it is defined beforehand that the same precoding processing is performed on the second control channel area for every one or a plurality of resource blocks, whereby the terminal 200 can perform the demodulation processing assuming that the same precoding processing is performed on these resources. For example, the terminal 200 can perform averaging or interpolation or the like on terminal-specific reference signals to be mapped to these resources. For example, description will be made regarding a case where the demodulation process is performed on the second control channels to be mapped to the resource 901 and resource 903. The terminal 200 can perform the demodulation process assuming that the same precoding processing is performed on the terminal-specific reference signal to be mapped to the resource 901 and the terminal-specific reference signal to be mapped to the resource 902. Also, the terminal 200 can perform the demodulation processing assuming that the same precoding processing is performed on the terminal-specific reference signal to be mapped to the resource 903 and the terminal-specific reference signal to be mapped to the resource 904.

Also, it is defined beforehand that the same precoding processing is performed between each resource where the second control channel is mapped, and a resource at another slot having the same frequency area as the resource thereof, whereby the terminal 200 can perform the demodulation processing assuming that the same precoding processing is performed on these resources. For example, the terminal 200 can perform averaging or interpolation or the like on the terminal-specific reference signals to be mapped to these resources. For example, description will be made regarding a case where the demodulation processing is performed on the second control channels to be mapped to the resource 901 and resource 903. The terminal 200 can perform the demodulation processing assuming that the same precoding processing is performed on the terminal-specific reference signal to be mapped to the resource 901 and the terminal-specific reference signal to be mapped to the resource 905. Also, the terminal 200 can perform the demodulation process assuming that the same precoding processing is performed on the terminal-specific reference signal to be mapped to the resource 903 and the terminal-specific reference signal to be mapped to the resource 907.

As described above, a method for mapping each of the second control channels to each slot in an RB pair in units of divided resources is employed as a method for mapping the second control channels to the second control channel area. Thus, the second control channels are mapped in a dispersed manner in the frequency direction, and accordingly, a frequency diversity effect is obtained at the terminal 200. In particular, the second control channel having the amount of information equivalent to one RB is mapped to part of a plurality of RBs in a dispersed manner, and accordingly, a frequency diversity effect is obtained at the terminal 200. Also, a frequency diversity effect is obtained without the second control channels which have the amount of information equivalent to two or more RBs increasing load of scheduling due to resource assignment.

Though description has been made in FIG. 9 regarding a case where the second control channel having the amount of information equivalent to one RB is mapped, mapping can also be performed at the second control channel having the amount of information equivalent to two or more RBs. For example, the second control channel 805 having the amount of information equivalent to two RBs are mapped using six sub carries on the left side in each RB of four RBs.

Also, though description has been made regarding the case of the second control channels being mapped to resources obtained by dividing each of the RBs into two in the frequency direction, to yield units of six sub carriers each, the mapping method is not restricted to this. That is to say, the second control channels can be mapped to a plurality of resources obtained by dividing each of the RBs in the frequency direction. For example, in the case of dividing each of the RBs into N resources in the frequency direction, each of the divided resources is configured of an integer number of sub carriers not exceeding $n^{RB}_{SC}/N$, the second control channels can be mapped with the resources thereof as a unit. Here, $n^{RB}_{SC}$ is the number of sub carriers in one RB. For example, the second control channels can be mapped to resources obtained by dividing each of the RBs into three in the frequency direction, to yield units of four sub carriers each.

Also, though description has been made regarding the case of mapping the second control channels to resources in units obtained by dividing each of the RBs in the frequency direction, the mapping method is not restricted to this. For example, the second control channels can be mapped with resources in units obtained by dividing each of the RBs in the temporal direction. For example, in the case of dividing each of the RBs into N resources in the temporal direction in increments of OFDM symbols, each of the divided resources is configured of an integer number of sub carriers not exceeding $n^{RB}_{SYMBOL}/N$, and the second control channels can be mapped with the resource thereof as a unit. Here, $n^{RB}_{SYMBOL}$ is the number of OFDM symbols in one RB where the second control channel can be mapped. Also, for example, the second control channels can be mapped to resources obtained by dividing each of the RBs in the temporal direction and in the frequency direction (resource element, resource element group) as a unit. In this case, the terminal 200 may perform estimation of a propagation channel assuming that the same precoding processing has been performed on terminal-specific reference signals within each of the RBs. Also, the terminal 200 may perform estimation of a propagation channel using cell-specific reference signals.

Also, for example, a resource element group is configured of a plurality of resource elements within an area set as the second control channel area, and the second control channels can be mapped with the resource element group thereof as a unit. Specifically, setting is performed wherein, in the case of dividing one RB into N, consecutive resource element group numbers are appended to the N RBs, and N second control channels can be mapped using a predetermined method. For example, resources where the second control channels are mapped can be obtained based on a remainder obtained by dividing the resource element group numbers thereof by N. For example, an arrangement may be made wherein, in the case of dividing one RB into two, consecutive resource element group numbers are appended to the two RBs, a resource of 0 and a resource of 1 which are the remainders obtained by dividing the resource element group numbers by 2 are set, the second control channels can be mapped each of the resources.

Figure 10:
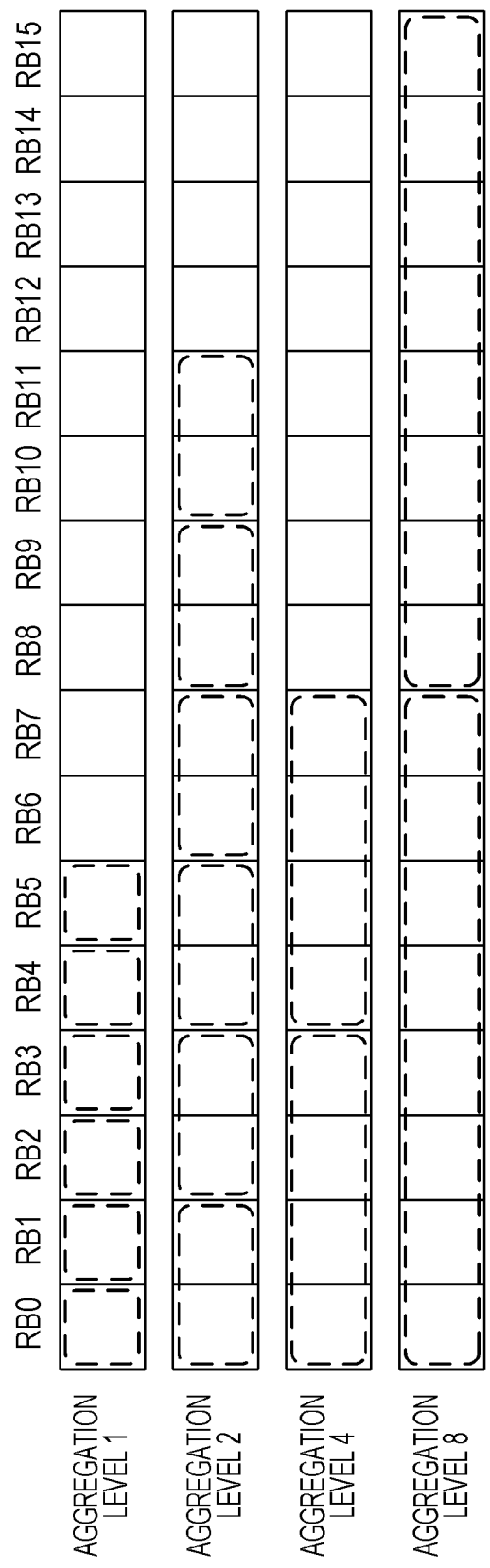
FIG. 10 is a diagram illustrating an example of SS for detecting second control channels at a terminal.
Figure 11:
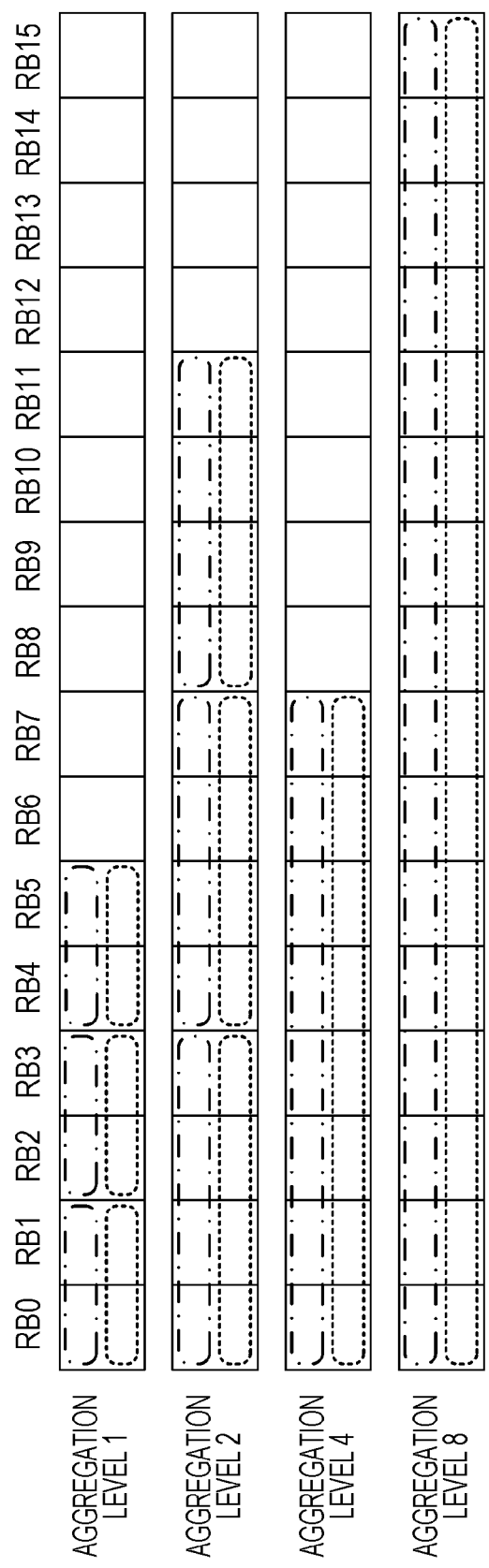
FIG. 11 is a diagram illustrating an example of an SS for detecting second control channels at the terminal.

Hereinafter, the SS for searching for the second control channels at the terminal 200 will be described. FIG. 10 is a diagram illustrating an example of the SS for searching for the second control channels at the terminal 200. FIG. 10 illustrates, such as illustrated in FIG. 6 and FIG. 7, the SS in the case of employing a method for mapping each of the second control channels with each slot in an RB pair as a unit, as a method for mapping the second control channels to the second control channel area. Also, FIG. 11 is a diagram illustrating an example of the SS for searching for the second control channels at the terminal 200. FIG. 11 illustrates, such as illustrated in FIG. 8 and FIG. 9, SS in the case of employing a method for mapping each of the second control channels with a plurality of divided resources for each slot in an RB pair as a unit, as a method for mapping the second control channels to the second control channel area.

The SS for searching for the second control channels at the terminal 200 can be configured of one or more resource blocks. That is to say, the SS is configured of an aggregation configured of one or more resource blocks (RB Aggregation), in units of resource blocks within an area set as the second control channel area. The number of RBs configuring this aggregation will be referred to as "RB aggregation level" (RB aggregation level). SS is configured of a plurality of RBs having a consecutive number from an RB having the smallest number, and the number of one or more RBs having a consecutive number is determined beforehand. The SS of each RB aggregation level is configured of an aggregation of a plurality of second control channel candidates.

The base station 100 transmits the second control channels using one or more RBs to be set at the terminal 200 using one of the methods for mapping the second control channels to the second control channel area. The terminal 200 performs decoding of a reception signal using one or more RBs within the SS, and performs processing for detecting the second control channels addressed to themselves (blind decoding). The terminal 200 sets a different SS for each RB aggregation level as illustrated in FIG. 10 and FIG. 11. Thereafter, the terminal 200 performs blind decoding using a predetermined combination of RBs with a different SS for each RB aggregation level. In other words, the terminal 200 performs blind decoding on each second control channel candidate within a different SS for each RB aggregation level (perform monitoring of E-PDCCH).

Hereinafter, description will be made regarding setting (switching) of the methods for mapping the second control channels to the second control channel area described above. Also, description will be made here regarding setting methods as to the method for mapping each of the second control channels with an RB as a unit as described in FIG. 6 and FIG. 7, and as to the method for mapping each of the second control channels in units of a plurality of resources divided from an RB as described in FIG. 8 and FIG. 9, as a method for mapping the second control channels to the second control channel area.

According to an example of setting methods (switching methods) regarding mapping of the second control channels, the base station 100 informs the terminal 200 of information indicating the method for mapping the second control channels employed at the terminal 200 as base-station-specific or terminal-specific control information through RRC signaling or PDCCH signaling. For example, the terminal-specific setting information of the second control channels includes information indicating the mapping method of the second control channels. Also, for example, information indicating the mapping method of the second control channels is broadcast as system information to be broadcast. Thus, the base station 100 can improve flexibility of setting regarding mapping of the second control channels, and thus effective data transmission to the terminal 200 can be realized.

According to another example of setting methods (switching methods) regarding mapping of the second control channels, the base station 100 may implicitly inform the terminal 200 of the mapping method of the second control channels employed at the terminal 200. For example, a mapping method for the second control channels can be set to the terminal 200 based on control information informed or notified by the base station 100. For example, a mapping method for the second control channels can be set to the terminal 200 based on the transmission mode informed by the base station 100. Specifically, in the case that the first transmission mode has been informed by the base station 100, a method for mapping each of the second control channels is set to the terminal 200 in units of RBs. In the case that the second transmission mode has been informed by the base station 100, a method for mapping each of the second control channels is set to the terminal 200 with a plurality of resources divided from an RB as a unit. For example, a method for mapping the second control channels can be set to the terminal 200 based on the antenna port number of the base station 100 informed by the base station 100. Thus, the base station 100 can realize setting regarding mapping of the second control channels without informing new control information to the terminal 200, and accordingly, overhead of control information can be reduced. Also, setting regarding mapping of the second control channels is performed based on the transmission mode, so a mapping method can be set using a transmission method defined or assumed by the transmission mode, and effective data transmission can be realized.

According to another example of setting methods (switching methods) regarding mapping of the second control channels, a mapping method for the second control channels can be set to the terminal 200 based on the resource allocation type informed by the base station 100 as a method for implicitly informing a mapping method for the second control channels employed at the terminal 200. Specifically, in the case that type 0 or type 2 Localized has been informed as the resource allocation type by the base station 100, a method for mapping each of the second control channels is set to the terminal 200 in units of RBs. Also, in the case that type 1 or type 2 Distributed has been informed as the resource allocation type by the base station 100, a method for mapping each of the second control channels is set to the terminal 200 with a plurality of resources divided from an RB as a unit. Thus, the base station 100 can realize setting regarding mapping of the second control channels to the terminal 200 without informing new control information to the terminal 200, whereby overhead of control information can be reduced. Also, setting regarding mapping of the second control channels is performed based on the resource allocation type, whereby a frequency diversity effect can be improved in the case that the second control channels are not consecutively mapped to PRBs, and effective data transmission can be realized.

According to another example of setting methods (switching methods) regarding mapping of the second control channels, a mapping method for the second control channels can be set to the terminal 200 based on the format (DCI format) of control information in the second control channels, as a method for the base station 100 to implicitly inform a mapping method for the second control channels employed at the terminal 200. Specifically, a method for mapping each of the second control channels can be set to the terminal 200 in units of RBs, for second control channels of which the DCI format has fewer bits less than a predetermined number. Also, a method for mapping each of the second control channels is set to the terminal 200 in units of a plurality of divided resources from an RB, for second control channels of which the DCI format has more bits than a predetermined number. Thus, the base station 100 can realize setting regarding mapping of the second control channels without informing the terminal 200 of new control information, so overhead of control information can be reduced. Also, setting regarding mapping of the second control channels is performed based on the DCI formats, so the frequency diversity effect can be switched according to the number of bits of the DCI format, and effective data transmission can be realized.

Figure 12:
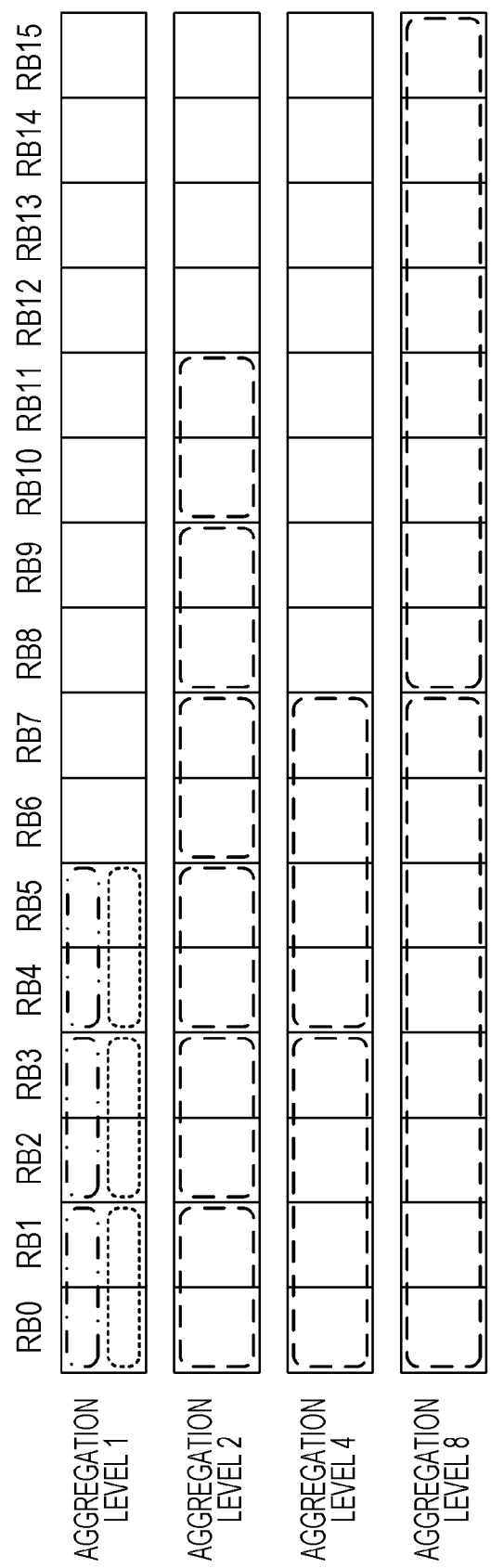
FIG. 12 is a diagram illustrating an example of the SS for detecting second control channels at the terminal.

According to another example of setting methods (switching methods) regarding mapping of the second control channels, a mapping method for the second control channels as to the second control channel area can be set to the terminal 200 based on the aggregation level in blind coding within the second control channel area. FIG. 12 is a diagram illustrating an example of the SS for searching for the second control channels at the terminal 200. When the terminal 200 performs blind decoding on the second control channels within the second control channel area, in the case that the aggregation level is 1, the base station 100 employs a method for mapping each of the second control channels in units of a plurality of resources divided from an RB, and in the case that the aggregation level is other than 1, employs a method for mapping each of the second control channels in units of an RB. On the other hand, the base station 100 can set a method for mapping the second control channels to the second control channel area based on the number of bits (amount of information) of the second control channel to be transmitted to the terminal 200 or the number of RBs necessary for transmission. For example, in the case that the number of RBs necessary for the second control channel to be transmitted to the terminal 200 is 1, the base station 100 employs a method for mapping each of the second control channels in units of a plurality of resources divided from an RB. In the case that the number of RBs necessary for the second control channel to be transmitted to the terminal 200 is equal to or greater than 2, the base station 100 employs a method for mapping each of the second control channels in units of an RB. Thus, the base station 100 can realize setting regarding mapping of the second control channels without informing new control information to the terminal 200, so overhead of control information can be reduced. The second control channel having the amount of information equivalent to one RB is mapped to part of a plurality of RBs in a dispersed manner, and accordingly, a frequency diversity effect is obtained at the terminal 200. Also, the second control channels having the amount of information equivalent to one RB or more can be subjected to averaging or interpolation or the like at the time of performing the demodulation processing on a plurality of terminal-specific reference signals to be multiplexed to each slot in an RB pair thereof, and good estimation precision of a propagation channel can be realized.

Note that, though description has been made regarding a case where all of the terminals can employ all of the defined methods regarding mapping of the second control channels to the second control channel area, the mapping method is not restricted to this. Specifically, the terminal 200 may inform the base station 100 of information indicating a mapping method for the second control channels which can be used as information indicating functions that the terminal 200 can handle (terminal capability information, FGI (Feature Group Indicator).

Note that, though description has been made regarding a case where the second control channels are mapped using a plurality of resources divided from each RB, the mapping method is not restricted to this. For example, an arrangement may be made wherein regarding mapping up to VRBs, the same method as with a case where the second control channels are mapped in units of RBs is employed, and regarding mapping from VRBs to PRBs, part or all of the VRBs where the second control channels are mapped are divided into a plurality of VRBs, and are mapped to PRBs using a predetermined method. For example, the plurality of divided VRBs may be mapped to PRBs after performing replacement processing between part or all of the VRBs thereof.

Second Embodiment

Hereinafter, a second embodiment of the present invention will be described. A communication system according to the preset second embodiment is the same as the communication system according to the first embodiment. The present embodiment will describe an example of assignment of PUCCH resources as to E-PDCCHs (second control channels). Hereinafter, portions described in the first embodiment will be omitted.

RBs within an E-PDCCH area are appended with a number $n^{E-PDCCH}_{RB}$ for identifying an RB. In the case of the RBs within an E-PDCCH area, the RBs making up the E-PDCCH are individually situated in the first slot and second slot, and a number for identifying an RB is also individually assigned. Here, description will be made regarding a case where the $n^{E-PDCCH}_{RB}$ is set independently from control information for assignment of a PUCCH resource to the first control channel (PDCCH). That is to say, part of the value of the $n^{E-PDCCH}_{RB}$ is overlapped with a value to be obtained by assignment of a PUCCH resource to the first control channel.

Upon detecting assignment information of a downlink data channel (hereinafter, referred to as downlink grant) in the E-PDCCH area, the terminal 200 employs a PUCCH resource according the RB number of an RB having the smallest RB number of RBs making up the E-PDCCH including the downlink grant to report HARQ response information of downlink transmission data (PDSCH) corresponding to the downlink grant.

Conversely, at the time of situating the E-PDCCH including the downlink grant, the base station 100 situates the E-PDCCH in the RB corresponding to the PUCCH resource where the terminal 200 reports the HARQ response information of the downlink transmission data (PDSCH). Also, the base station 100 receives the HARQ response information corresponding to the PDSCH transmitted to the terminal 200 via a PUCCH scheduled beforehand.

Here, the HARQ response information is information indicating whether or not the terminal 200 has correctly received the transmission data in the data channel. For example, the HARQ response information in the case that the terminal 200 has correctly received the transmission data indicates a positive response (ACK; Acknowledgement). The HARQ response information in the case that the terminal 200 has not correctly received the transmission data indicates a negative response (NACK; Negative Acknowledgement). Also, the HARQ response information can be generated and informed for each transmission data (code word) to be subjected to error correction coding.

Now, description will be made regarding the PUCCH resource. The HARQ response information is dispersed to a sample area making up SC-FDMA (Single Carrier Frequency Division Multiple Access) in the uplink using cyclic-shifted pseudo-CAZAC (Constant-Amplitude Zero-Auto-Correlation) series, and further dispersed to a 4SC-FDMA symbol within a slot using OCC (Orthogonal Cover Code) with a code length of 4. Also, the symbol dispersed by two codes is mapped to RBs having a different frequency. Thus, the PUCCH resource is defined with three factors of cyclic shift amount, orthogonal code, an RB to be mapped. Note that the cyclic shift in the SC-FDMA sample area can be expressed with phase rotation which evenly increases in a frequency area.

Hereinafter, an example of a specific assignment method of a PUCCH resource will be described. Of RBs making up an E-PDCCH including the downlink grant, a PUCCH resource having an index $n_{PUCCH}$ agreeing with a value obtained by adding $N_D$, which is a terminal-specific parameter, to the RB number $n^{E-PDCCH}_{RB}$ of the first RB, is a PUCCH resource assigned to the HARQ response information of the downlink transmission data corresponding to the downlink grant.

Now, as described above, the RB number $n^{E-PDCCH}_R 3$ of an RB in the E-PDCCH area, and control information for assignment of a PUCCH resource to the first control channel are individually numbered, and accordingly, in the case that one or more PDCCHes and one or more E-PDCCHes are situated within the same sub frame, or in the case that two or more E-PDCCHes are situated within the same sub frame, the base station 100 performs scheduling wherein the downlink grant is situated in the PDCCH or E-PDCCH. This scheduling is performed so that all of the PUCCH resources where the HARQ response information of the downlink transmission data (PDCCH) corresponding to the downlink grant to be mapped each PDCCH or each E-PDCCH have a different number.

Also, in the case that a plurality of PUCCH resources corresponding to one E-PDCCH are necessary, a PUCCH resource of the RBs making up the E-PDCCH including the downlink grant corresponding to the RB number of an RB having the smallest RB number, and further a PUCCH resource having a greater index than that PUCCH resource by one, are employed.

Figure 13:
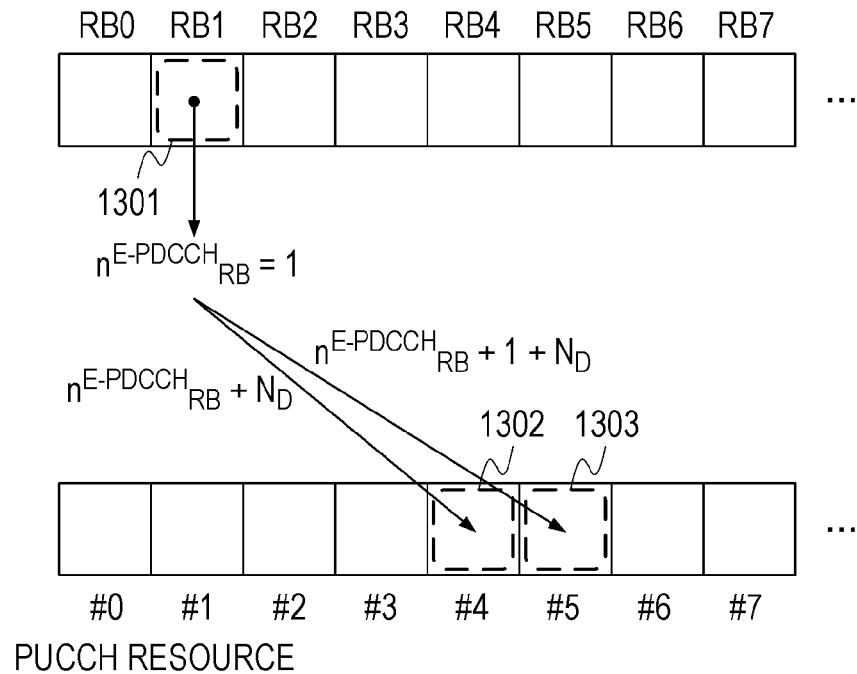
FIG. 13 is a diagram illustrating assignment of a PUCCH resource for the second control channels.

FIG. 13 is a diagram illustrating assignment of a PUCCH resource to the second control channel. Note that the E-PDCCH illustrated in FIG. 13 employs, such as illustrated in FIG. 6 and FIG. 7, a method for mapping each of the second control channels in units of RBs as a mapping method of the second control channels to the second control channel area. Also, the RB number $n^{E-PDCCH}_{RB}$ for identifying an RB within the E-PDCCH area is numbered in order from an RB having a lower frequency, from an RB having a lower VRB number at the time of being mapped to a VRB, or from an RB having a lower PRB number at the time of being mapped to a PRB.

The example in FIG. 13 illustrates assignment of PUCCH resources to a second control channel 1301 mapped to the RB1 of RBs making up an E-PDCCH including the downlink grant. Also, the example in FIG. 13 illustrates a case where the $N_D$ which is a terminal-specific parameter is 3. A PUCCH resource 1302 having an index $n_{PUCCH}$ agreeing with a value obtained by adding the $N_D$ which is a terminal-specific parameter to the RB number $n^{E-PDCCH}_{RB}$ of the first RB in the second control channel 1301, and a PUCCH resource 1303 having an index $n_{PUCCH}$ agreeing with a value obtained by adding 1 and the $N_D$ which is a terminal-specific parameter to the RB number $n^{E-PDCCH}_{RB}$ of the first RB are PUCCH resources assigned to the HARQ response information of the downlink transmission data corresponding to the downlink grant. Note that, in the case that a plurality of PUCCH resources are necessary, PUCCH resources each having a greater index by one may be employed in the same way as described above.

Figure 14:
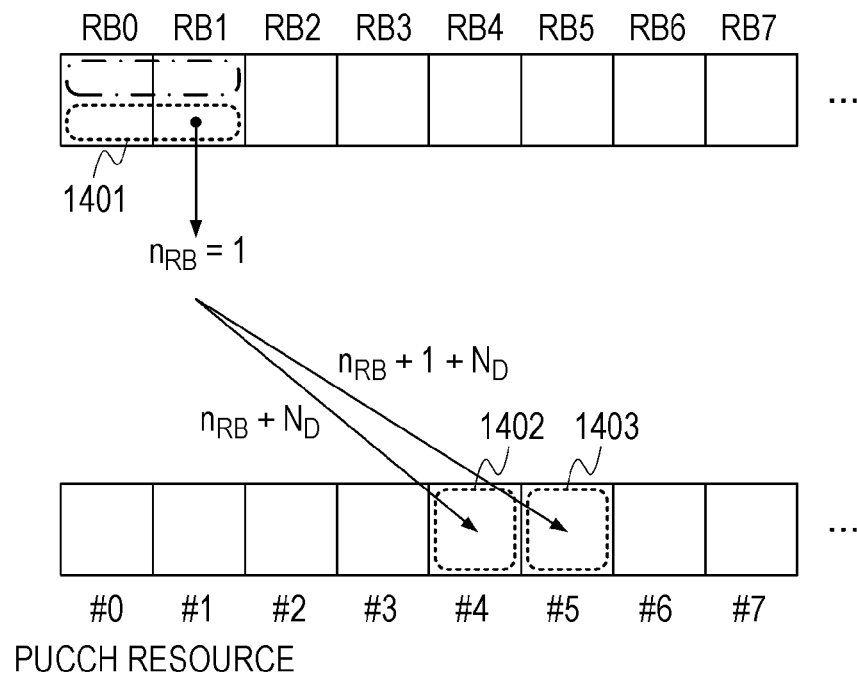
FIG. 14 is a diagram illustrating assignment of a PUCCH resource for the second control channels.
Figure 15:
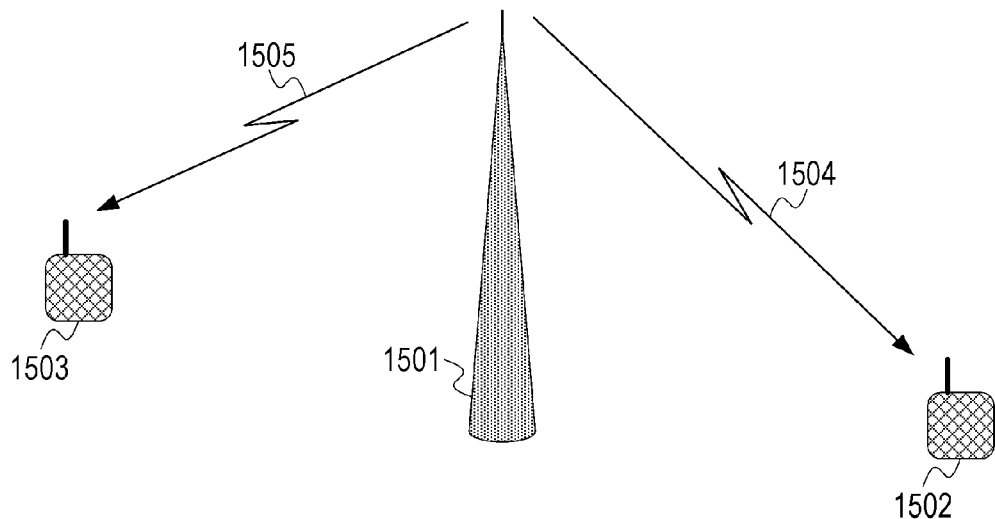
FIG. 15 is a diagram illustrating an example employing the multiuser MIMO format.
Figure 16:
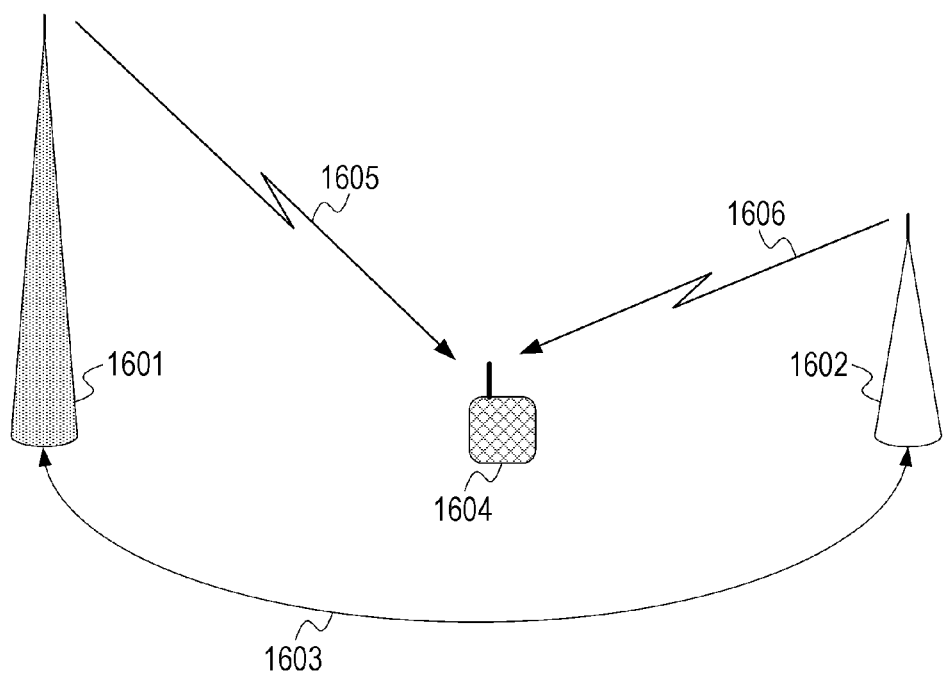
FIG. 16 is a diagram illustrating an example employing the CoMP format.

FIG. 14 is a diagram illustrating assignment of a PUCCH resource to the second control channel. Note that the E-PDCCH illustrated in FIG. 14 employs, such as illustrated in FIG. 8 and FIG. 9, a method for mapping each of the second control channels with a plurality of resources divided from an RB as a unit as a mapping method of the second control channels to the second control channel area. Also, the RB number $n^{E-PDCCH}_{RB}$ for identifying an RB within the E-PDCCH area is numbered in order from an RB having a lower frequency, from an RB having a lower VRB number at the time of being mapped to a VRB, or from an RB having a lower PRB number at the time of being mapped to a PRB. Also, RB numbers are appended based on a method defined beforehand as to a resource to which each of the E-PDCCH is mapped. For example, in the case of dividing each RB in the frequency direction, RB numbers are appended to the resources in order from resources lower in frequency. Also, in the case of dividing each RB in the temporal direction, RB numbers are appended to the resources in order from resources earlier in time. Further, in the case of dividing each RB in the frequency direction and in the temporal direction, RB numbers are appended to the resources in order from resources lower in frequency and/or resources earlier in time.

The example in FIG. 14 illustrates assignment of PUCCH resources to a second control channel 1401 mapped to the RB1 of RBs making up an E-PDCCH including the downlink grant. Here, though the second control channel 1401 having the amount of information equivalent to one RB is situated in the RB0 and RB1 in a dispersed manner, the second control channel 1401 can be regarded as the second control channel mapped to the RB1 by numbering based on a method defined beforehand. Also, the example in FIG. 14 illustrates a case where the $N_D$ which is a terminal-specific parameter is 3. A PUCCH resource 1402 having an index $n_{PUCCH}$ agreeing with a value obtained by adding the $N_D$ which is a terminal-specific parameter to the RB number $n^{E-PDCCH}_{RB}$ of the first RB in the second control channel 1401, and a PUCCH resource 1403 having an index $n_{PUCCH}$ agreeing with a value obtained by adding 1 and the $N_D$ which is a terminal-specific parameter to the RB number $n^{E-PDCCH}_{RB}$ of the first RB are PUCCH resources assigned to the HARQ response information of the downlink transmission data corresponding to the downlink grant. Note that, in the case that a plurality of PUCCH resources are necessary, PUCCH resources each having a greater index by one may be employed in the same way as described above.

Note that, though description has been made in FIG. 13 and FIG. 14 regarding a case where the $n^{E-PDCCH}_{RB}$ is numbered may in order from 0, the $n^{E-PDCCH}_{RB}$ may be VRB numbers numbered as to VRBs to which the RBs within the E-PDCCH area are mapped. Alternatively, an arrangement may be made wherein when performing blind decoding within the E-PDCCH area, the $n^{E\text{-}PDCCH}_{RB}$ sequentially numbered to the RBs within E-PDCCH area is employed, and at the time of correlation with the PUCCH resources, the VRB numbers are employed. At the time of mapping from an E-PDCCH resource to a PUCCH resource, the same mapping method as the method described with reference to FIG. 13 and FIG. 14 can be employed just by replacing the $n^{E\text{-}PDCCH}_{RB}$ with the VRB number.

Note that, though description has been made in the above embodiments using the data channel, control channels, and resource elements or resource blocks serving as mapping units of PDSCH, PDCCH, and reference signals, and using sub frames and radio frames serving as transmission units in the temporal direction, the present invention is not restricted to these. The same advantage can be obtained even when replacing these with an area made up of an optional frequency and time, and time units. Note that, though description has been made in the above embodiments regarding a case of demodulating RSs subjected to precoding processing using a port equivalent to the layer of MIMO as a port corresponding to the RS subjected to precoding processing, the present invention is not restricted to this. In addition to this, the same advantage can be obtained by applying the present invention to ports corresponding to mutually different signals. For example, an arrangement may be made wherein an Unprecoded RS is employed instead of the Precoded RS, and a port equivalent to a port or physical antenna (or a combination of physical antennas) equivalent to an output end after the precoding processing is employed.

A program which runs on the base station 100 and terminal 200 according to the present invention is a program for controlling a CPU and so forth (program causing a computer to function) so as to realize the functions of the above-embodiments according to the present invention. Information to be handled at these devices is temporarily stored in RAM (Random Access Memory) at the time of processing thereof, and thereafter stored in various types of ROM (Read Only Memory) or HDD (Hard Disk Drive), on which readout and modification/writing is performed by a CPU according to need. A recording medium in which a program is stored may be any of a semiconductor medium (e.g., ROM, nonvolatile memory card, etc.), an optical recording medium (e.g., DVD (Digital Versatile Disc), MO (Magneto-Optical disc), MD (Mini-Disc), CD (Compact Disc), BD (Blu-ray Disc), etc.), a magnetic recording medium (e.g., magnetic tape, flexible disk, etc.), and so forth. Also, not only the functions of the above embodiments are realized by executing the loaded program, but also the function of the present invention may be realized by performing processing in collaboration with an operating system or another application program or the like based on instructions of the program thereof.

Also, in the case of distributing the program to the market, the program may be distributed by being stored in a portable recording medium, or may be transferred to a server computer connected via a network such as the Internet or the like. In this case, a storage device of the server computer is also encompassed in the present invention. Also, part or all of the base station 100 and terminal 200 according to the above embodiments may be realized typically as an LSI (Large Scale Integration), which is an integrated circuit. The function blocks of the base station 100 and terminal 200 may individually be converted into chips, or a part or all thereof may be integrated as a chip. Also, the technique of circuit integration is not restricted to LSIs, and may be realized by a dedicated circuit or general-purpose processor. Also, in the case that a technique of circuit integration alternative to LSI has emerged according to advances in semiconductor technology, an integrated circuit according to this technology may be employed.

Though detailed description has been made regarding embodiments of the present invention with reference to the drawings, specific configurations are not restricted to the embodiments, and design modifications and so forth which do not depart from the essence of the present invention are also encompassed. Also, various modifications may be made within the scope described in the Claims, and embodiments obtained by combining technical means disclosed in each of the different embodiments are also encompassed in the technical scope of the present invention. Further, configurations in which components described in the above embodiments are replaced with components configured to achieve the same advantages, are also encompassed.

INDUSTRIAL APPLICABILITY

The present invention is preferably used for a wireless base station device, a wireless terminal device, a wireless communication system, and a wireless communication method.

REFERENCE SIGNS LIST

100, 1501 base station
101, 206 higher layer
102 data channel generating unit
103 second control channel generating unit
104 terminal-specific reference signal multiplexing unit
105 precoding unit
106 first control channel generating unit
107 cell-specific reference signal multiplexing unit
108 transmission signal generating unit
109 transmission unit
200, 1502, 1503, 1504 terminal
201 reception unit
202 reception signal processing unit
203 propagation channel estimating unit
204 control channel processing unit
205 data channel processing unit
601 to 606, 801 to 806, 1301, 1401 second control channel
701 to 704, 901 to 908 resource
1402, 1403, 1502, 1503 PUCCH resource
1504, 1505, 1605, 1606 downlink
1601 macro base station
1602 RRH
1603 line

The invention claimed is:

1. A base station apparatus configured to communicate with a terminal apparatus, the base station apparatus comprising:
a higher layer processor configured or programmed to configure a resource block set for the terminal apparatus to monitor an enhanced physical downlink control channel; and
a transmitter configured to transmit the enhanced physical downlink control channel using one or more resources; wherein
the resource block set includes a plurality of resource block pairs;
each of the plurality of resource block pairs includes numbered resource element groups;

the enhanced physical downlink control channel is transmitted using either a first transmission or a second transmission on a basis of information configured by a higher layer;

for the first transmission, each of the one or more resources consists of N resource element groups in a single resource block pair within the plurality of resource block pairs, each of the N resource element groups being one of the numbered resource element groups;

for the second transmission, each of the one or more resources consists of M resource element groups in more than one resource block pair within the plurality of resource block pairs, each of the M resource element groups being one of the numbered resource element groups; and N and M have equal integer values.

2. The base station apparatus according to claim 1, wherein each of the numbered resource element groups is constituted by resource elements having a resource element group number.

3. The base station apparatus according to claim 1, wherein the enhanced physical downlink control channel is transmitted using a resource element to which at least a cell-specific reference signal or a channel state information reference signal is not mapped.

4. The base station apparatus according to claim 1, wherein the enhanced physical downlink control channel is transmitted using an OFDM symbol different from an OFDM symbol to be used for transmission of a physical downlink control channel.

5. The base station apparatus according to claim 1, wherein the enhanced physical downlink control channel is transmitted using a second antenna port different from a first antenna port to be used for transmission of a physical downlink control channel;

and wherein the first antenna port is an antenna port to be used for transmission of a cell-specific reference signal, and the second antenna port is an antenna port to be used for transmission of a demodulation reference signal.

6. A terminal apparatus configured to communicate with a base station apparatus, the terminal apparatus comprising:

a higher layer processor configured or programmed to configure a resource block set for the terminal apparatus to monitor an enhanced physical downlink control channel; and a control channel processor configured or programmed to monitor a candidate of the enhanced physical downlink control channel on one or more resources; wherein the resource block set includes a plurality of resource block pairs;

each of the plurality of resource block pairs includes numbered resource element groups;

the enhanced physical downlink control channel is transmitted using either a first transmission or a second transmission on a basis of information configured by a higher layer;

for the first transmission, each of the one or more resources consists of N resource element groups in a single resource block pair within the plurality of resource block pairs, each of the N resource element groups being one of the numbered resource element groups;

for the second transmission, each of the one or more resources consists of M resource element groups in more than one resource block pair within the plurality of resource block pairs, each of the M resource element groups being one of the numbered resource element groups; and N and M have equal integer values.

7. The terminal apparatus according to claim 6, wherein each of the numbered resource element groups is constituted by resource elements having a resource element group number.

8. The terminal apparatus according to claim 6, wherein the enhanced physical downlink control channel is transmitted using a resource element to which at least a cell-specific reference signal or a channel state information reference signal is not mapped.

9. The terminal apparatus according to claim 6, wherein the enhanced physical downlink control channel is transmitted using an OFDM symbol different from an OFDM symbol to be used for transmission of a physical downlink control channel.

10. The terminal apparatus according to claim 6, wherein the enhanced physical downlink control channel is transmitted using a second antenna port different from a first antenna port to be used for transmission of a physical downlink control channel;

and wherein the first antenna port is an antenna port to be used for transmission of a cell-specific reference signal, and the second antenna port is an antenna port to be used for transmission of a demodulation reference signal.

11. A communication method of a base station apparatus configured to communicate with a terminal apparatus, the method comprising:

a step for configuring a resource block set for the terminal apparatus to monitor an enhanced physical downlink control channel; and a step for transmitting the enhanced physical downlink control channel using one or more resources; wherein the resource block set includes a plurality of resource block pairs;

each of the plurality of resource block pairs includes numbered resource element groups;

the enhanced physical downlink control channel is transmitted using either a first transmission or a second transmission on a basis of information configured by a higher layer;

for the first transmission, each of the one or more resources consists of N resource element groups in a single resource block pair of the plurality of resource block pairs, each of the N resource element groups being one of the numbered resource element groups;

for the second transmission, each of the one or more resources consists of M resource element groups in more than one resource block pair within the plurality of resource block pairs, each of the M resource element groups being one of the numbered resource element groups; and N and M have equal integer values.

12. A communication method of a terminal apparatus configured to communicate with a base station apparatus, the method comprising:

a step for a resource block set for the terminal apparatus to monitor an enhanced physical downlink control channel; and a step for monitoring a candidate of the enhanced physical downlink control channel on one or more resources; wherein the resource block set includes a plurality of resource block pairs;

each of the plurality of resource block pairs includes numbered resource element groups;

the enhanced physical downlink control channel is transmitted using either a first transmission or a second transmission on a basis of information configured by a higher layer;

for the first transmission, each of the one or more resources consists of N resource element groups in a single resource block pair within the plurality of resource block pairs, each of the N resource element groups being one of the numbered resource element groups;

for the second transmission, each of the one or more resources consists of M resource element groups in more than one resource block pair within the plurality of resource block pairs, each of the M resource element groups being one of the numbered resource element groups; and N and M have equal integer values.

* * * * *